(12) United States Patent
Agarwal et al.

(10) Patent No.: US 10,776,684 B1
(45) Date of Patent: Sep. 15, 2020

(54) MIXED CORE PROCESSOR UNIT

(71) Applicant: Sandia Corporation, Albuquerque, NM (US)

(72) Inventors: Sapan Agarwal, Albuquerque, NM (US); Alexander H. Hsia, Albuquerque, NM (US); Matthew Marinella, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 962 days.

(21) Appl. No.: 15/341,991

(22) Filed: Nov. 2, 2016

(51) Int. Cl.
*G06N 3/04* (2006.01)
*G06N 3/08* (2006.01)

(52) U.S. Cl.
CPC ............. *G06N 3/04* (2013.01); *G06N 3/08* (2013.01)

(58) Field of Classification Search
CPC .......... G06N 3/063; G06N 3/04; G06N 3/049; Y04S 10/54
See application file for complete search history.

(56) References Cited

U.S. PATENT DOCUMENTS

| 3,665,756 A * | 5/1972 | Russell | G01L 1/2281 73/766 |
| 2008/0147954 A1* | 6/2008 | Mouttet | G06F 7/607 710/317 |
| 2012/0127779 A1* | 5/2012 | Scheuerlein | G11C 5/02 365/148 |

FOREIGN PATENT DOCUMENTS

| WO | WO-2017026989 A1 * | 2/2017 | ......... G11C 13/0002 |
| WO | WO-2017105517 A1 * | 6/2017 | ......... G11C 11/5685 |

OTHER PUBLICATIONS

Sureja, N. M. and Chawda, B. V., 2012, International Journal of Emerging Technology and Advanced Engineering, vol. 2, Issue 4, pp. 621-624) (Year: 2012).*
Cruz-Albrecht et al., "A scalable neural chip with synaptic electronics using CMOS integrated memristors," Sep. 2013, IOP Publishing, Nanotechnology 24, pp. 1-11 (Year: 2013).*
Yamaoka, M. et al., "20k-spin Ising Chip for Combinational Optimization Problem with CMOS Annealing," Session 24, Secure, Efficient Circuits for IoT 24.3, IEEE International Solid-State Circuits Conference, Feb. 25, 2015, pp. 432-434.
Agarwal, S. et al., "Resistive Memory Device Requirements for a Neural Algorithm Accelerator," International Joint Conference on Neural Networks (IJCNN), IEEE World Congress on Computational Intelligence, Jul. 24-29, 2016, pp. 929-938.

* cited by examiner

*Primary Examiner* — Miranda M Huang
*Assistant Examiner* — Catherine F Lee
(74) *Attorney, Agent, or Firm* — Yee & Associates, P.C.

(57) ABSTRACT

A method and apparatus for processing data. The data is sent to a processor unit comprising a group of neural cores, a group of digital processing cores, and a routing network connecting the group of digital processing cores. The data is processed in the processor unit to generate a result.

25 Claims, 18 Drawing Sheets

US 10,776,684 B1

MIXED CORE PROCESSOR UNIT

GOVERNMENT LICENSE RIGHTS

This invention was made with United States Government support under Contract No. DE-AC04-94AL85000 between Sandia Corporation and the United States Department of Energy. The United States Government has certain rights in this invention.

BACKGROUND INFORMATION

1. Field

The present disclosure relates generally to an improved computer system and, in particular, to a method and apparatus for processing data using a mixed core processor unit in the computer system. Still more particularly, the present disclosure relates to a method and apparatus for processing data using a processing unit having neural cores and digital processing cores in the processor unit in the computer system.

2. Background

In data processing systems, processor units execute instructions to run processes and process data. A processor unit may include one or more cores that read and execute program instructions in the form of central processing unit instructions. These instructions may include, for example, add, move data, branch, and other types of instructions executed by a core.

These processor units process the data to provide results. The amount of the data processed for some applications is extremely large. With these large amounts of the data, the speed at which the data is processed may be slower than desired. The processing of the data may be performed using supercomputers to increase the speed at which the data is processed. This type of processing, however, may use more energy than desired.

Further, often times the processing of the data may occur in devices or locations where the supercomputers cannot be used. For example, in automobiles and satellites, the amount of power available for processing large amounts of the data may be lower than needed.

Therefore, it would be desirable to have a method and apparatus that take into account at least some of the issues discussed above, as well as other possible issues. For example, it would be desirable to have a method and apparatus that overcome a technical problem with processing large amounts of data with a desired use of energy.

SUMMARY

An embodiment of the present disclosure provides a group of neural cores, a group of digital processing cores, and a routing network connecting the group of digital processing cores. The group of neural cores processes analog data and the group of digital processing cores processes digital data.

Another embodiment of the present disclosure provides a method for processing data. The data is sent to a processor unit comprising a group of neural cores, a group of digital processing cores, and a routing network connecting the group of digital processing cores. The data is processed in the processor unit to generate a result.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that increased precision in processor units may allow for analyzing more data. Those embodiments recognize and take into account that higher precision may be accomplished by using a processor unit with mixed cores. In other words, the processor unit has different types of cores.

Thus, the illustrative embodiments provide a method and apparatus for processing data. In one illustrative example, a processor unit comprises a group of neural cores, a group of digital processing cores, and a routing network connecting the group of digital processing cores.

As used herein, "a group of", when used with reference to items, means one or more items. For example, "a group of neural cores" is one or more neural cores.

Figure 1:
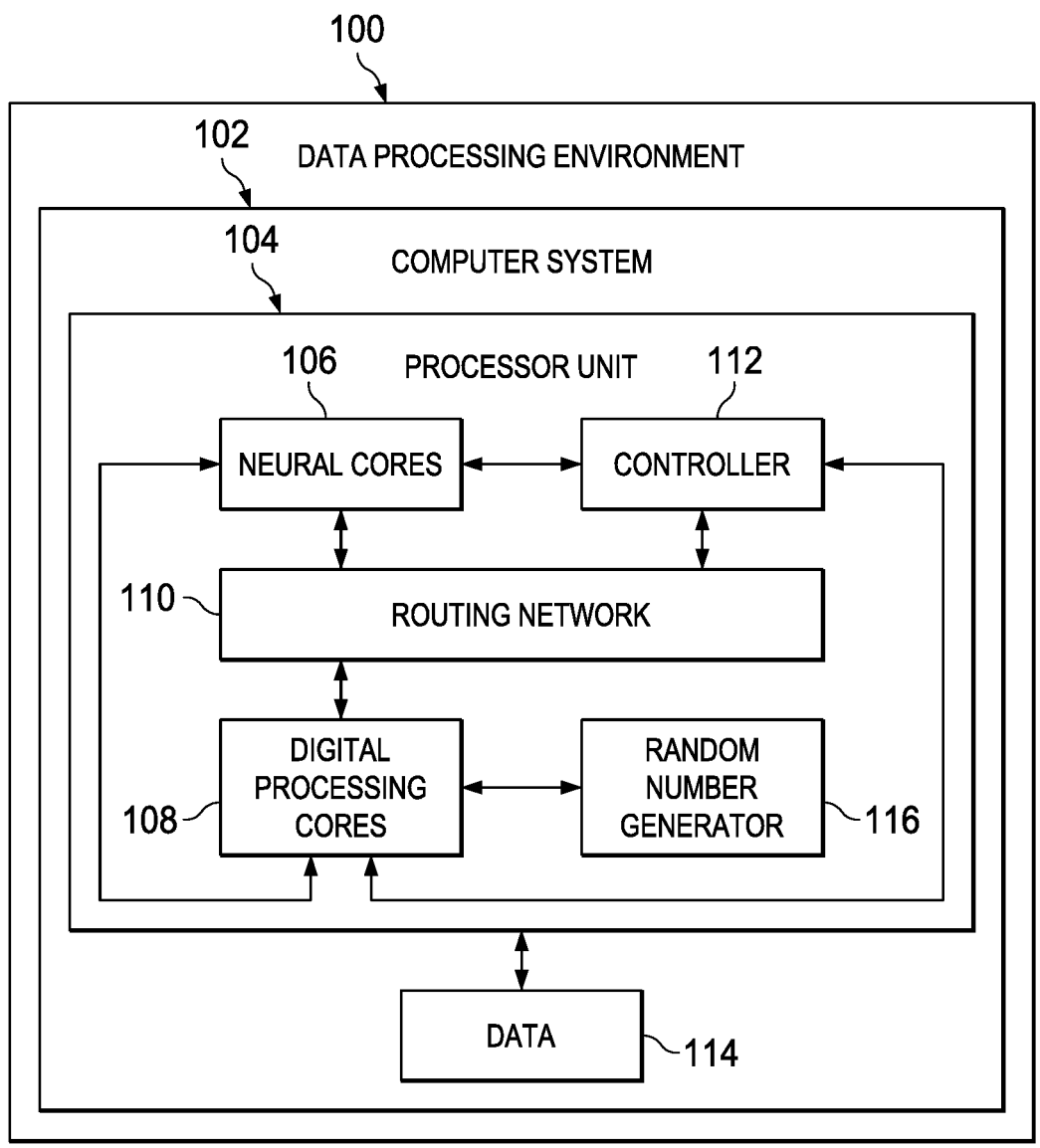
FIG. 1 is an illustration of a block diagram of a data processing environment in accordance with an illustrative embodiment.

With reference now to the figures and, in particular, with reference to FIG. 1, an illustration of a block diagram of a data processing environment is depicted in accordance with an illustrative embodiment. In this example, data processing environment 100 includes computer system 102. Computer system 102 is a physical hardware system that includes one or more data processing systems. When more than one data processing system is present, those data processing systems may be in communication with each other using a communications medium. The communications medium may be a network. The data processing systems may be selected from at least one of a computer, a server computer, a workstation, a tablet computer, a laptop computer, a mobile phone, or some other suitable data processing system.

As used herein, the phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

In this illustrative example, computer system 102 includes processor unit 104. As depicted, processor unit 104 comprises a group of neural cores 106, a group of digital processing cores 108, routing network 110, and controller 112.

In this illustrative example, the group of neural cores 106 process data 114 in an analog fashion while the group of digital processing cores 108 processes data 114 digitally. The group of digital processing cores 108 performs at least one of receiving data 114 from routing network 110, performing arithmetic operations on data 114, providing inputs to the group of neural cores 106, processing the outputs of the group of neural cores 106, or sending data 114 out to other digital processing cores in digital processing cores 108.

In other words, the group of neural cores 106 processes digital data in data 114. The group of digital processing cores 108 processes digital data in data 114. As depicted, data 114 takes the form of digital data and analog data. These different forms may be converted using analog-to-digital converters for use by the different types of cores in processor unit 104.

As depicted, a single digital processing core may control one or several ones of neural cores 106. A single digital processing core controlling several ones of neural cores 106 can combine the outputs of multiple ones of neural cores 106 to perform advanced functions. These advanced functions include periodic carry, as explained later.

In the illustrative example, any digital architecture such as a general processing unit (GPU) core, or an advanced reduced instruction set computer (RISC) machine (ARM) core can be used for the digital processing core. The digital processing core can optionally use dense resistive memory as the instruction store while using more costly SRAM caches to store inputs, outputs and any working data. This configuration allows a dense but lower endurance resistive memory to store data that is infrequently changed while a static random access memory (SRAM) cache and register files are used to store rapidly changing data. One of the most expensive operations in a digital processing core is random number generation as pseudo random number generators take a large amount of area. Consequently, hardware random number generators can be used to accelerate that computation. For even greater efficiency at the cost of flexibility, the digital logic can be tailored to perform a single function and run a single algorithm.

Routing network 110 connects the group of digital processing cores 108 to each other. In the illustrative example, the group of neural cores 106 is connected to the group of digital processing cores 108. In other works, the group of neural cores 106 may be connected to the group of digital processing cores 108 and not to routing network 110. In another illustrative example, the group of neural cores 106 is connected to routing network 110. The connection to routing network 110 is a direct connection. In other words, the group of neural cores 106 is connected to routing network 110 without having the group of digital processing cores 108 as a component connecting the group of neural cores 106 to routing network 110.

Controller 112 is connected to at least one of the group of neural cores 106 or the group of digital processing cores 108. Controller 112 may be used to initialize at least one of the group of neural cores 106, the group of digital processing cores 108, or routing network 110.

Additionally, controller 112 also may control processing of data 114 by at least one of the group of neural cores 106 or the group of digital processing cores 108 during operation of processor unit 104. The connection of controller 112 to at least one of the group of neural cores 106 or the group of digital processing cores 108 may be through routing network 110 or a direct connection made without using routing network 110.

As depicted, controller 112 may program the group of digital processing cores 108 with a series of instructions and routing addresses. Controller 112 also may be used to control the timing between digital processing cores 108 and tell each digital processing core when it should process the inputs it has received. In this example, each digital processing core may store inputs in a buffer, process them when instructed by controller 112, and use the group of neural cores 106 to perform matrix operations. The result may then be sent to the next buffer for the digital processing core as soon as a result is computed. Alternatively, each digital processing core can operate independently and asynchronously, processing inputs as they are received.

Further, other components may be used in addition to or in place of the one shown in this figure. For example, random number generator 116 may also be included in processor unit 104. In this illustrative example, random number generator 116 is connected to digital processing cores 108. With random number generator 116, the group of neural cores 106 and the group of digital processing cores 108 in processor unit 104 may be configured to perform a stochastic search using random numbers generated by random number generator 116. Alternatively, random number generator 116 may be connected to neural cores 106 instead of digital processing cores 108.

The stochastic search, also referred to as simulated annealing, is performed to find the minimum of an energy landscape and is used to solve optimization problems such as quadratic unconstrained binary optimization. A stochastic solver is based on many parallel stochastic bits. Each bit will randomly be 0 or 1. The probability of a given bit is determined by its neighboring bits' states and problem specific weights. By allowing each bit to randomly and asynchronously update itself, the system evolves towards its most probable configuration, thereby solving an optimization problem or simulating the equilibrium distribution of a physical system. The probability of a bit can be any arbitrary function of other bits and external control signals. The probably of the bit depends on the particular optimization being solved.

In this illustrative example, the stochastic search can be efficiently mapped onto processor unit 104. Routing network 110 is configured to map the connections between bits. The weights for those connections are stored in neural cores 106. The stochastic bit states are stored in digital processing cores 108. Neural cores 106 perform a weighted sum on the incoming connections and pass the result to digital processing cores 108. Digital processing cores 108 then perform a probability computation and update the bit states using random number generator 116. The updated bit states are then communicated to other cores through routing network 110. The process then repeats, allowing the network to settle to a low energy state.

Figure 2:
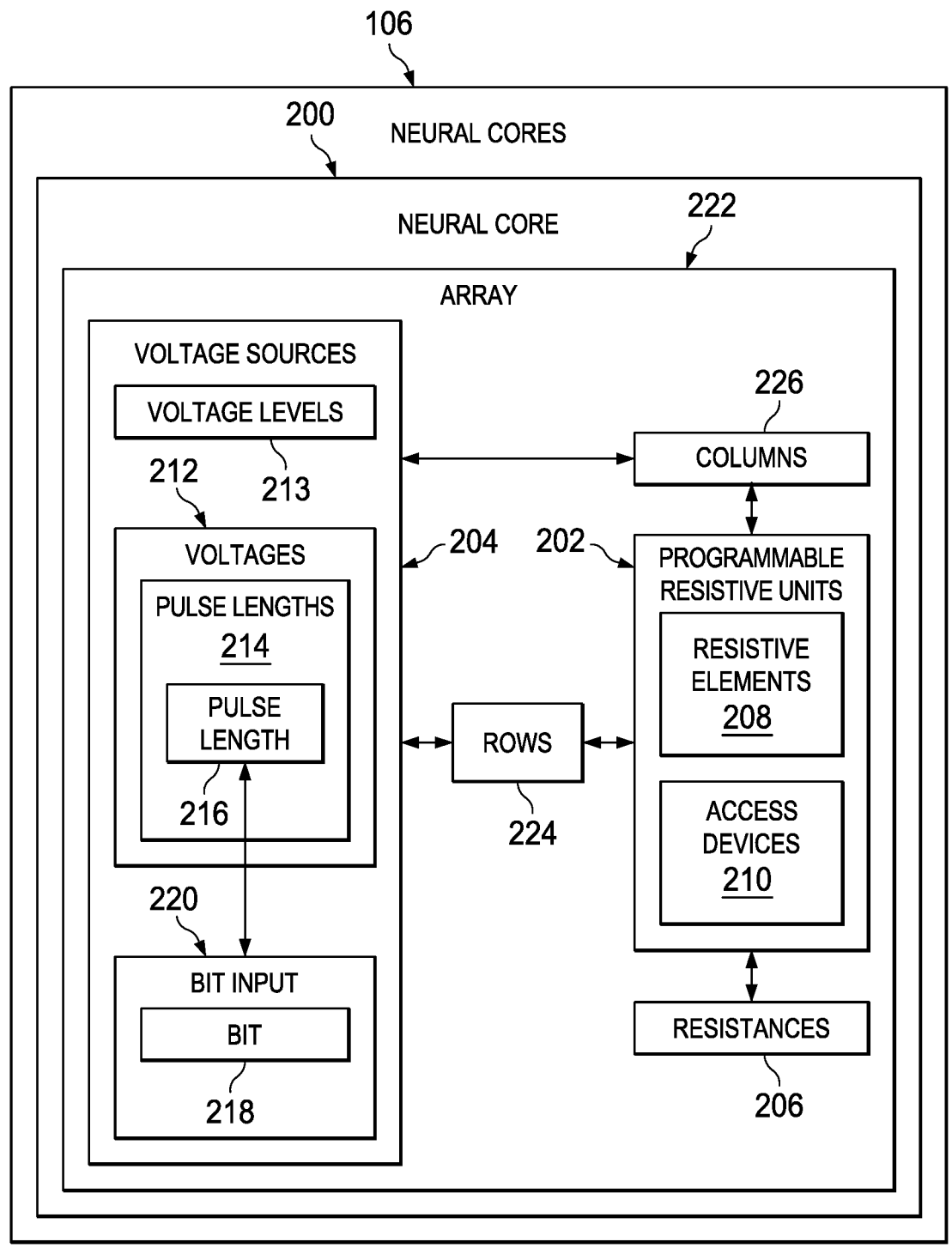
FIG. 2 is an illustration of a block diagram of a neural core in a group of neural cores in accordance with an illustrative embodiment.

With reference next to FIG. 2, an illustration of a block diagram of a neural core in a group of neural cores is depicted in accordance with an illustrative embodiment. In the illustrative examples, the same reference numeral may be used in more than one figure. This reuse of a reference numeral in different figures represents the same element in the different figures.

As depicted, neural core 200 in the group of neural cores 106 depicts one manner in which the different neural cores in the group of neural cores 106 may be implemented. In other words, the other ones of neural cores 106 may be implemented in the same manner as neural core 200 or may have different implementations. As a result, the group of neural cores 106 may be homogeneous or heterogeneous in architecture.

In this illustrative example, neural core 200 includes a number of different components. As depicted, neural core 200 includes programmable resistive units 202 and voltage sources 204.

Programmable resistive units 202 have resistances 206 that are changeable during operation of neural core 200. In this example, each of programmable resistive units 202 functions as a memory cell. The changing of resistances 206 may be performed in parallel or series.

As depicted, programmable resistive units 202 include resistive elements 208 and access devices 210. Resistive elements 208 may be changed such that different voltages occur across resistive elements 208. Access devices 210 may optionally be used to turn on and off different ones of resistive elements 208 based on use or nonuse of different ones of resistive elements 208. In this illustrative example, access devices 210 are two terminal devices that block current at low voltages and allow current to flow at higher voltage, such as Zener diodes or mixed ionic electronic conduction devices. Transistors can also be used as access devices 210.

As depicted, programmable resistive units 202 are arranged in array 222. As depicted, array 222 has rows 224 and columns 226.

Voltage sources 204 are connected to programmable resistive units 202. In this example, voltage sources 204 are connected to rows 224 of programmable resistive units 202. Voltage sources 204 also may be connected to columns 226 of programmable resistive units 202.

As depicted, voltage sources 204 may be used to read along rows 224, read along columns 226, or program programmable resistive units 202 in which voltage sources 204 on both rows 224 and columns 226 are used.

Voltage sources 204 generate voltages 212 with at least one of voltage levels 213 that are variable or pulse lengths 214 that are variable. In this illustrative example, pulse length 216 in pulse lengths 214 represents bit 218 in bit input 220. For example, voltage levels 213 may be variable while pulse lengths 214 are fixed. In another example, voltage levels 213 may be fixed while pulse lengths 214 are variable. In yet another illustrative example, voltage levels 213 and pulse lengths 214 may be variable or both may be fixed depending on the particular implementation.

In this illustrative example, inputs to neural core 200 are digital values that can have a higher precision than the digital-to-analog converters used in neural core 200. Neural core 200 can either round the higher precision value to the nearest value supported by the digital-to-analog converters or neural core 200 can stochastically round to either of the nearest two values. For example, if the value of 5.7 is to be stochastically rounded to the nearest integer, the result will be five 30% of the time and six 70% of the time. The rounding probability is weighted by the value being rounded off. Stochastic rounding allows for training with a lower precision of the digital-to-analog converters in neural core 200. Averaged over many training examples, this technique allows neural core 200 to learn from the higher precision information with lower precision of digital-to-analog converters.

In this manner, neural core 200 can be trained to stochastically round values in a manner that increases a precision in neural core 200 beyond the digital-to-analog converters in neural core 200. Thus, this type of rounding may be trained in neural core 200 to overcome limits in precision caused by the digital-to-analog converters.

Figure 3:
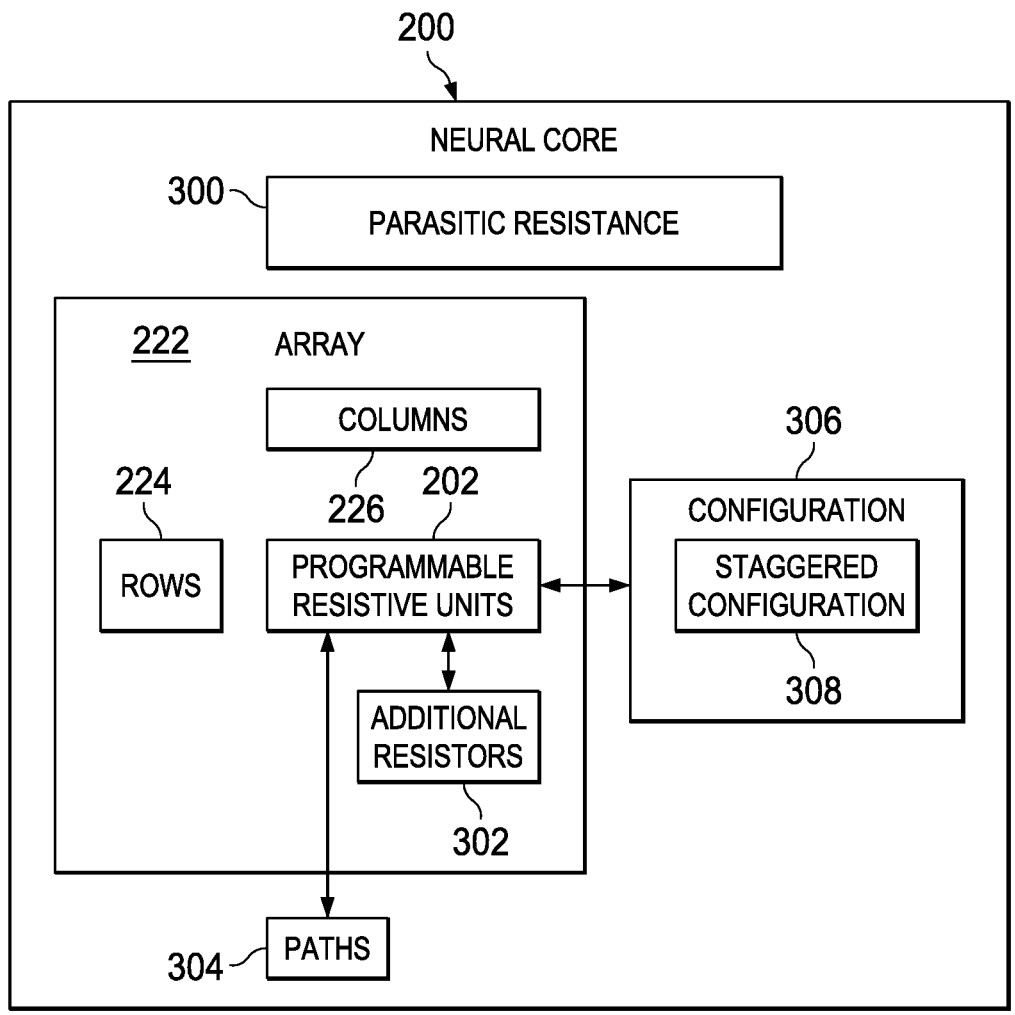
FIG. 3 is an illustration of a block diagram of architecture for an array of programmable resistive units in a neural core in accordance with an illustrative embodiment.

With reference to FIG. 3, an illustration of a block diagram of architecture for an array of programmable resistive units in a neural core is depicted in accordance with an illustrative embodiment. In this illustrative example, parasitic resistance 300 may be present within neural core 200. As depicted, additional resistors 302 are added to array 222 of programmable resistive units 202 to reduce or eliminate the impact of parasitic resistance 300. Additional resistors 302 may make the resistance across some or all of paths 304 through array 222 substantially the same in neural core 200. For example, additional resistors 302 may be present in at least one of a group of rows 224 or a group of columns 226 such that a voltage drop in each path through programmable resistive units 202 is substantially equal to other paths through programmable resistive units 202.

In another the illustrative example, parasitic resistance 300 may be reduced through configuration 306 of programmable resistive units 202 in array 222. For example, programmable resistive units 202 are arranged in array 222 having configuration 306 in the form of staggered configuration 308 that equalizes voltage drops in paths 304 through at least one of the group of rows 224 and the group of columns 226 in neural core 200. In other words, the voltage drops in paths 304 are controlled to be substantially the same.

Figure 4:
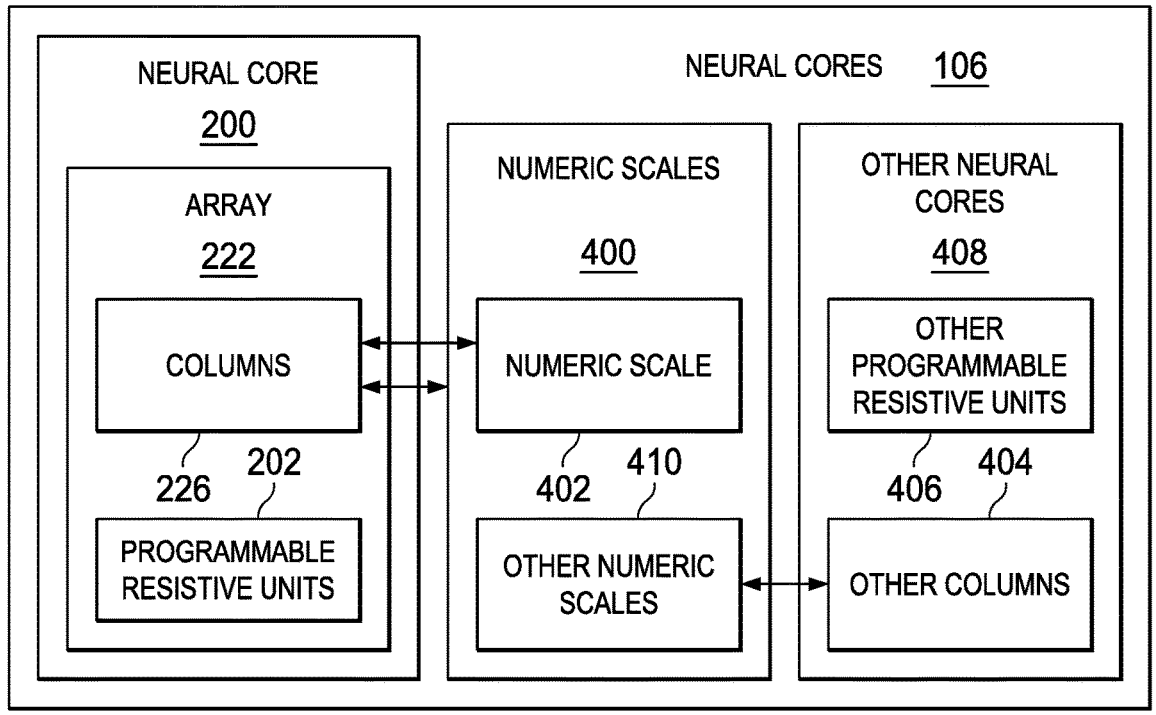
FIG. 4 is an illustration of a block diagram of architecture for programmable resistive elements in a neural core that increases precision of processing data by the neural core in accordance with an illustrative embodiment.

With reference now to FIG. 4, an illustration of a block diagram of architecture for programmable resistive elements in a neural core that increases precision of processing data by the neural core is depicted in accordance with an illustrative embodiment. In this illustrative example, programmable resistive units 202 in neural core 200 and other ones of neural cores 106 may be configured to have different numeric scales 400 to increase precision.

In one illustrative example, columns 226 of programmable resistive units 202 in neural core 200 are configured to have different numeric scales 400. In other words, columns 226 are configured to represent different numeric scales such that different columns in columns 226 in neural core 200 have different numeric scales 400. In this example, numeric scales 400 are different within neural core 200. Some or other ones of neural cores 106 may have the same configuration as this example using neural core 200.

In yet another illustrative example, the precision may be increased by assigning different ones of numeric scales 400 to different ones of neural cores 106. For example, columns 226 of programmable resistive units 202 in neural core 200 are configured to have numeric scale 402 in numeric scales 400, and wherein other columns 404 in other programmable resistive units 406 in a group of other neural cores 408 are configured to have a group of other numeric scales 410 in numeric scales 400.

In this manner, columns 226 of programmable resistive units 202 in neural core 200 are configured to represent a digit in a positional number system in numeric scales 400. Other columns 404 in other programmable resistive units 406 in the group of other neural cores 408 are configured to represent a different digit in the positional number system in numeric scales 400.

The positional number system may take various forms. For example, the positional number system may be a base ten number system, a base eight number system, a hexadecimal number system, or some other suitable type of number system.

In one illustrative example, one or more technical solutions are present that overcome a technical problem with processing large amounts of data with a desired use of energy. As a result, one or more technical solutions may provide a technical effect allowing for increased precision in processing data by computer system 102 using processor unit 104 in FIG. 1. As a result, computer system 102 operates as a special purpose computer system in which processor unit 104 in computer system 102 enables at least one of increased precision or increased processing power to process data 114 in FIG. 1. In particular, processor unit 104 with the group of neural cores 106 and a group of digital processing cores 108 in FIG. 1 transforms computer system 102 into a special purpose computer system as compared to currently available general computer systems that do not have processor unit 104.

Further, the architecture of processor unit 104 as described herein enables both training and executing of neural networks on processor unit 104. In other words, different processor units are not needed to perform both training and execution of neural networks using the architecture described for processor unit 104.

Figure 5:
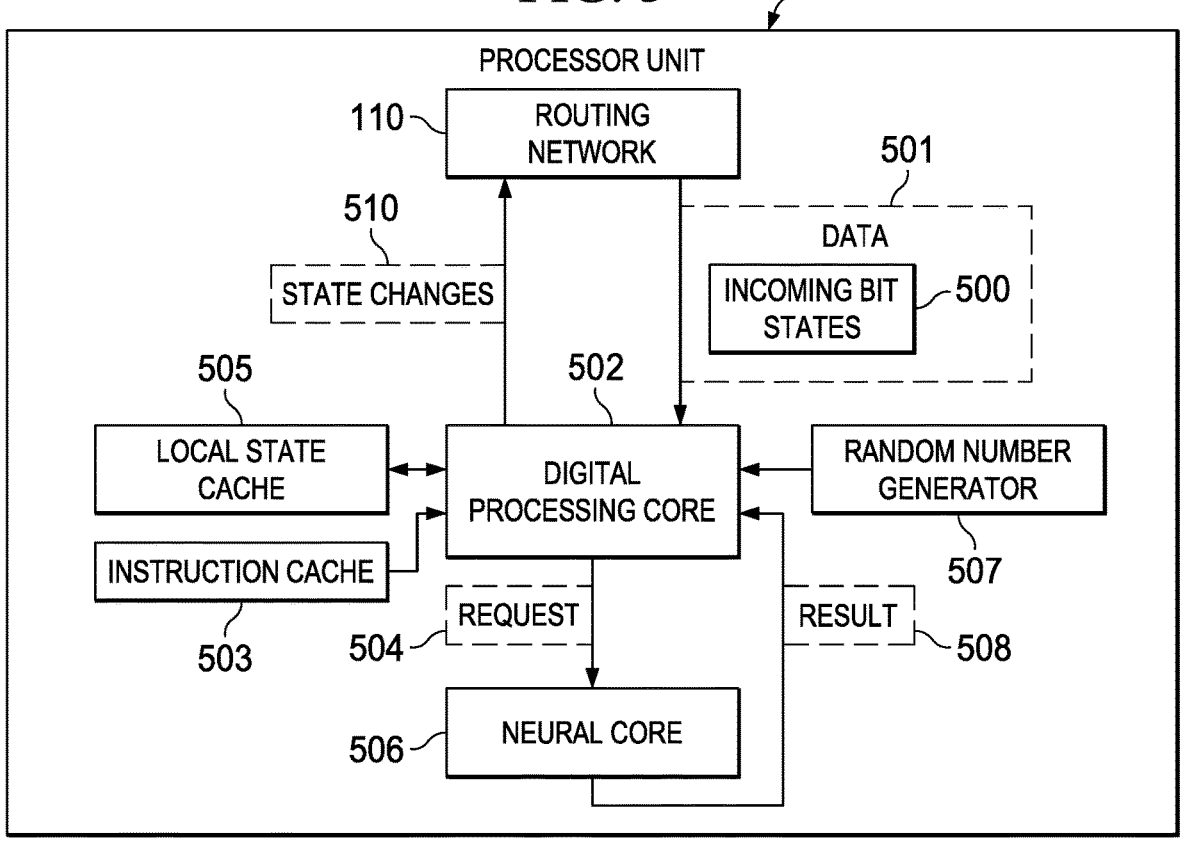
FIG. 5 is illustration of a block diagram of a data flow diagram for processing data in a processing unit in accordance with an illustrative embodiment.

With reference now to FIG. 5, an illustration of a block diagram of a data flow diagram for processing data in a processing unit is depicted in accordance with an illustrative embodiment. In this illustrative example, some components in processor unit 104 are shown to illustrate data flow for processing of data 501. Data 501 is data that may be processed, used for training, or some combination thereof. Data 501 may originate from within processor unit 104, such as from other digital processing cores. In other illustrative examples, data 501 also may be received from outside of processor unit 104. Data 501 also may include error vectors generated during training in these illustrative examples.

In this example, processor unit 104 is initialized to process data 501. The initialization may include setting up routing network 110, setting neural core weights, setting digital processing cores for computing probability in states, and setting initial random states.

In this illustrative example, data 501 in the form of incoming bit states 500 is sent to digital processing core 502 from routing network 110. As depicted, digital processing core 502 sends request 504 to neural core 506. Request 504 is to perform a vector matrix multiply.

As a result, neural core 506 processes request 504 and generates result 508. Result 508 is a result from performing the vector matrix multiply.

With result 508, digital processing core 502 computes new states, which are state changes 510. In this illustrative example, state changes 510 may include various types of information. This information may include, for example, error vectors which are used as training data. State changes 510 are sent to other digital processing cores in the group of digital processing cores 108 in FIG. 1 over routing network 110. Further, the analog processing provided by the group of neural cores 106 in FIG. 1 and the digital processing provided by the group of digital processing cores 108 in FIG. 1 provide a hybrid of data 114 processing within processor unit 104.

In this illustrative example, random number generator 507 is present within processor unit 104. Random number generator 507 is connected to digital processing core 502. Random number generator 507 may generate random numbers for use in different operations. For example, random number generator 507 may generate random numbers for use in performing stochastics simulated annealing.

As depicted, instruction cache 503 is connected to digital processing core 502. Instruction cache 503 stores machine instructions that configure digital processing core 502 and tell digital processing core 502 what operations to perform. Local state cache 505 is also connected to digital processing core 502. This stores local states and intermediate results between processing cycles. Instruction cache 503 and local state cache 505 may be constructed from any memory technology including a digital resistive random access memory (ReRAM), a static random access memory (SRAM), and register files. The contents of instruction cache 503 do not change often. As a result, a memory, such as a digital resistive random access memory, may be chosen to optimize for density and read speed. Local state cache 505 may change every cycle. As a result, a fast write memory, such as a static random access memory, may be chosen.

The illustrations of data processing environment 100 and the different components in FIGS. 1-5 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 6:
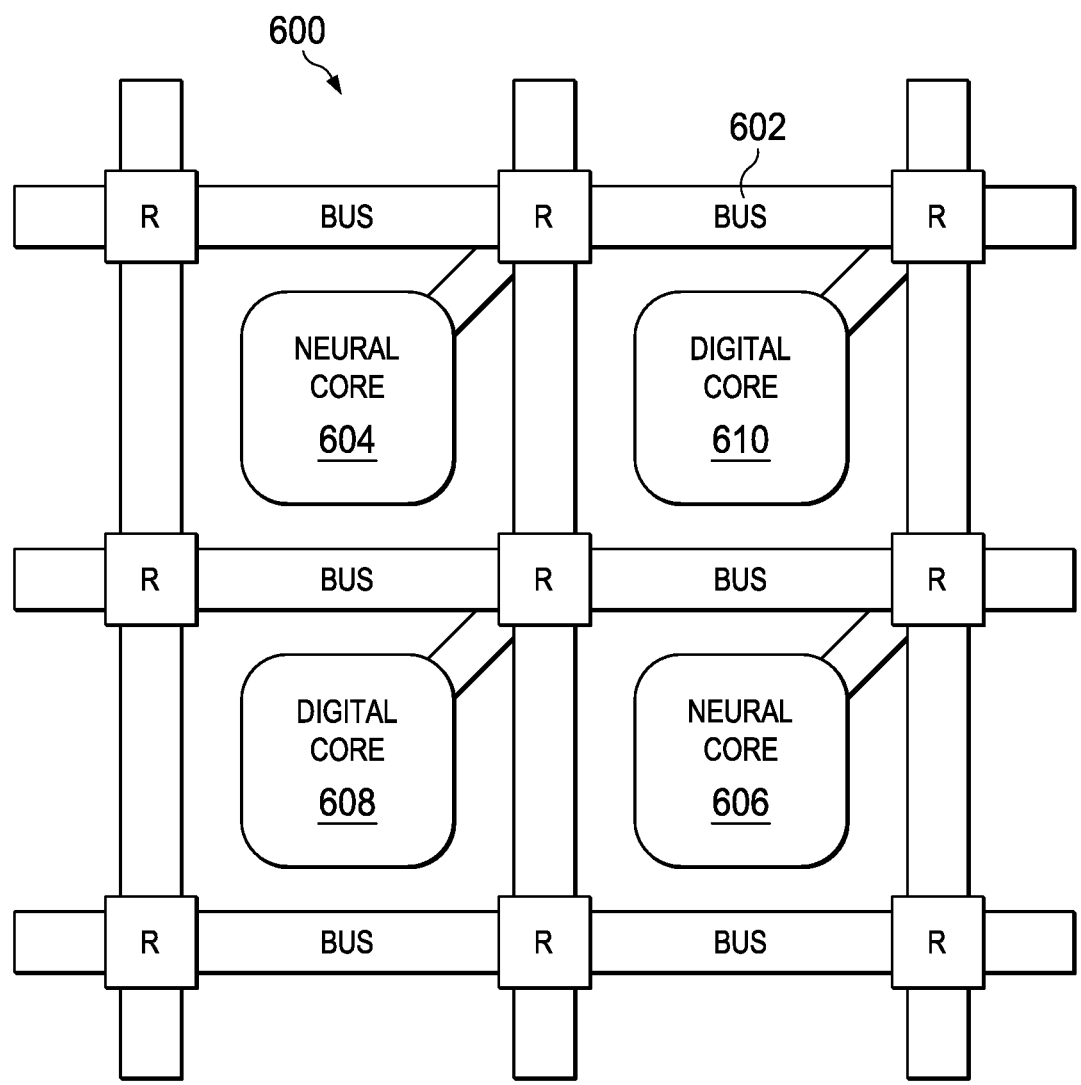
FIG. 6 is an illustration of a portion of a processor unit in accordance with an illustrative embodiment.

With reference now to FIG. 6, an illustration of a portion of a processor unit is depicted in accordance with an illustrative embodiment. In this illustrative example, a portion of processor unit 600 is shown. Processor unit 600 is an example of one implementation for processor unit 104 shown in block form in FIG. 1.

As depicted, processor unit 600 includes routing network 602. Routing network 602 is an example of one implementation for routing network 110 shown in block form in FIG. 1. In this illustrative example, routing network 602 is a bus system that provides connections to neural core 604, neural core 606, digital processing core 608, and digital processing core 610. The bus system includes busses and routers in which the routers are represented by (R) in the figure. As depicted, each of these cores is directly connected to routing network 602. In other words, the cores are not connected to other cores to communicate with routing network 602.

Figure 7:
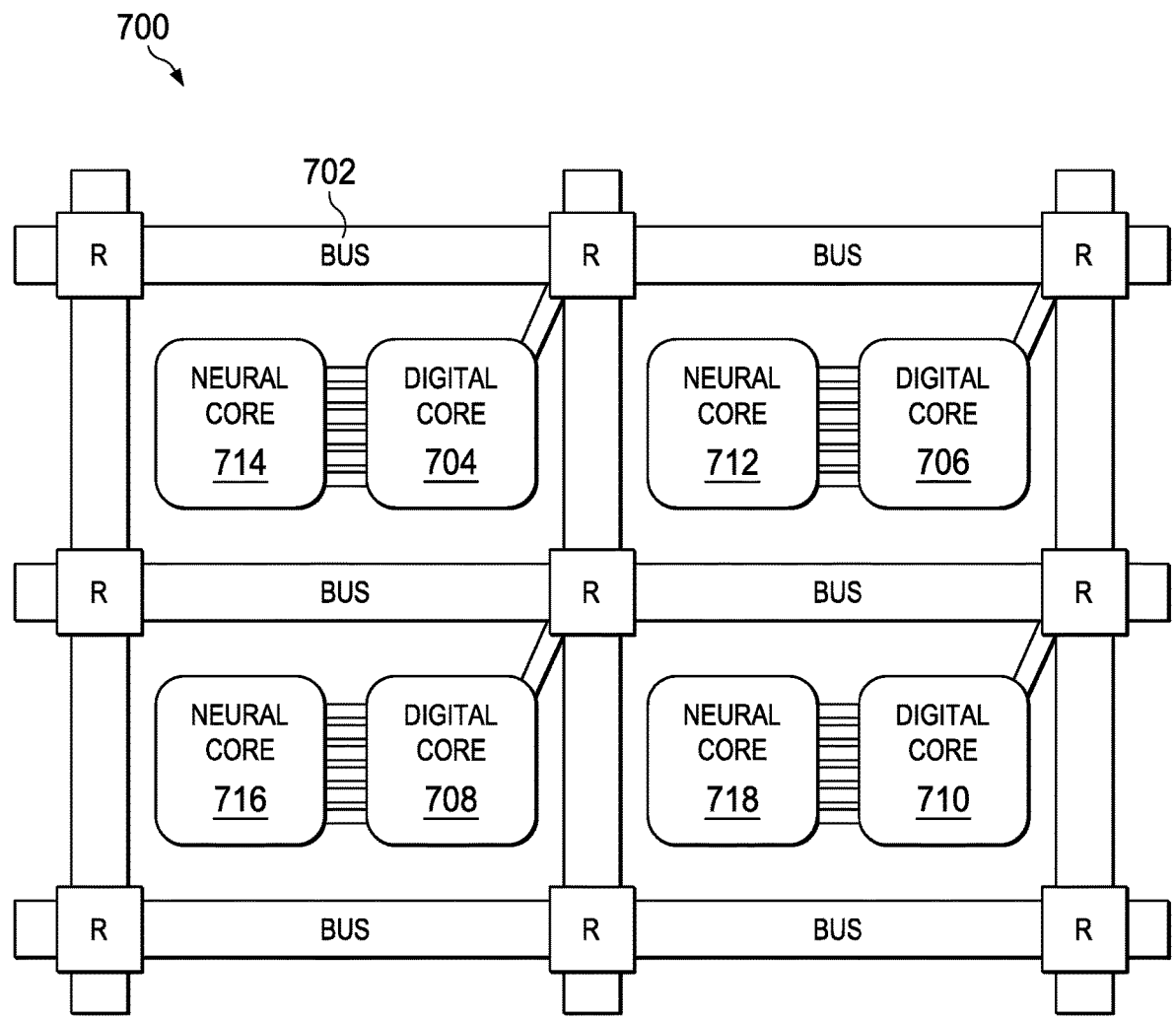
FIG. 7 is another illustration of a portion of a processor unit in accordance with an illustrative embodiment.

Turning to FIG. 7, another illustration of a portion of a processor unit is depicted in accordance with an illustrative embodiment. In this illustrative example, a portion of processor unit 700 is shown. Processor unit 700 is an example of one implementation for processor unit 104 shown in block form in FIG. 1.

As depicted, processor unit 700 includes routing network 702. Routing network 702 provides direct connections to digital processing core 704, digital processing core 706, digital processing core 708, and digital processing core 710. In this illustrative example, neural core 712 is connected to digital processing core 706; neural core 714 is connected to digital processing core 704; neural core 716 is connected to digital processing core 708; and neural core 718 is connected to digital processing core 710. In this example, the neural cores are indirectly connected to routing network 702.

With this type of architecture, neural cores perform parallel vector matrix multiplication, matrix vector multiplication, and parallel rank 1 outer-product updates. The digital processing cores can also use digital on-chip resistive memory instruction caches to store slowly changing data while reserving expensive static random access memory (SRAM) caches for the data being processed.

Figure 8:
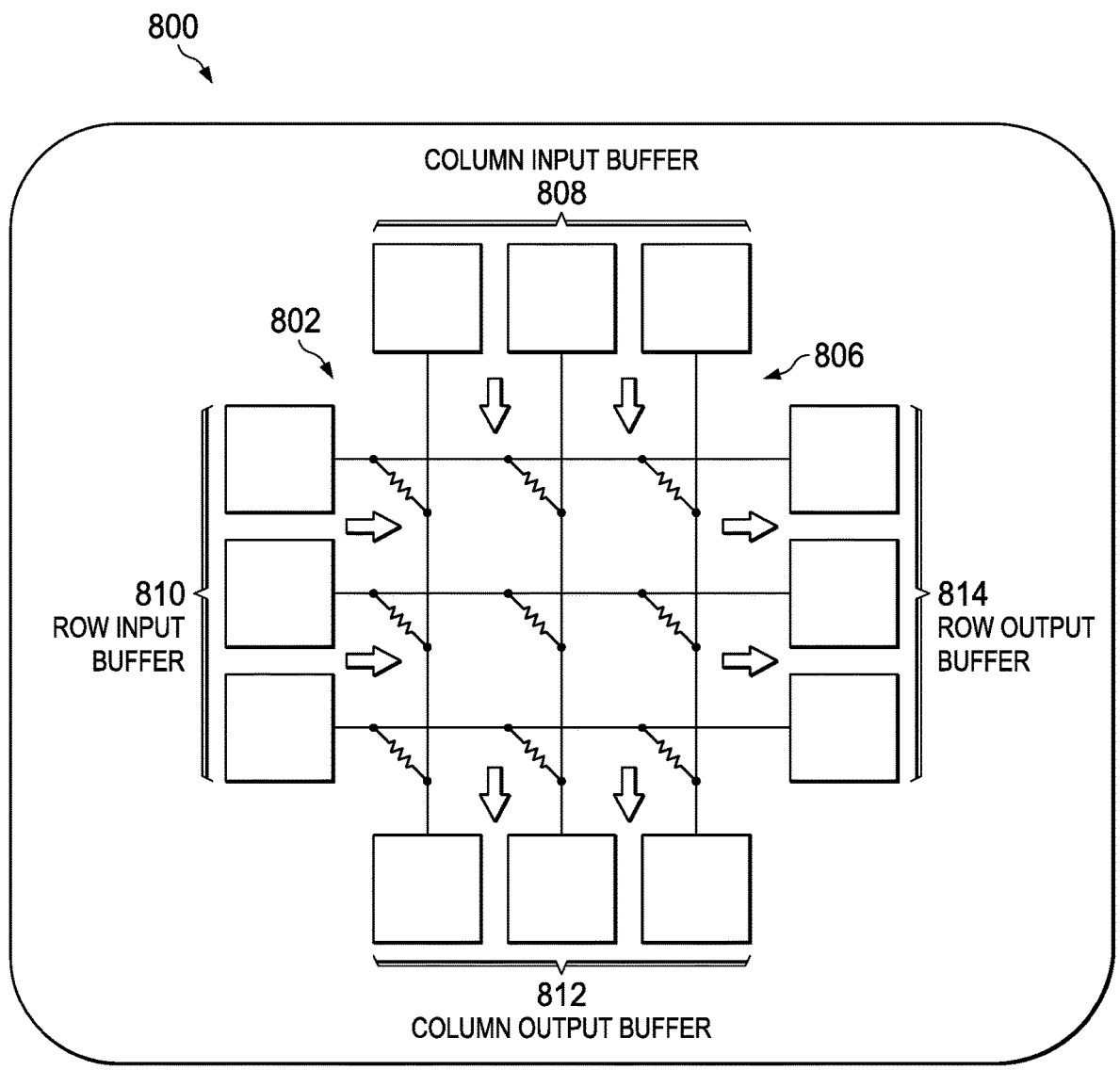
FIG. 8 is an illustration of a neural core in accordance with an illustrative embodiment.

Turning next to FIG. 8, an illustration of a neural core is depicted in accordance with an illustrative embodiment. In this depicted example, neural core 800 is an example of one implementation for a neural core shown FIG. 1, FIG. 6, and FIG. 7.

As depicted, neural core 800 includes array 802 of programmable resistive units 806. Array 802 is connected to column input buffer 808, row input buffer 810, column output buffer 812, and row output buffer 814.

As depicted, column input buffer 808 and row input buffer 810 include digital-to-analog converters to convert digital data into analog data for processing within neural core 800. Further, column output buffer 812 and row output buffer 814 include analog-to-digital converters that convert analog data generated by neural core 800 into digital data. The digital data may then be prospected processing cores in the processor unit.

For example, the illustration of array 802 in neural core 800 is depicted with three columns and three rows. In other illustrative examples, other numbers of rows and columns may be used. For example, 50 rows, 75 rows, 30 columns, 100 columns, 50 rows, 75 rows, or some other number of rows and columns may be used. Further, the different buffers may also include other components in addition to analog-to-digital converters and digital-to-analog converters. For example, operational amplifiers, memory storage, or other components also may be present.

Thus, neural core 800 has digital inputs and digital outputs. Neural core 800, however, performs calculations using analog processes.

Figure 9:
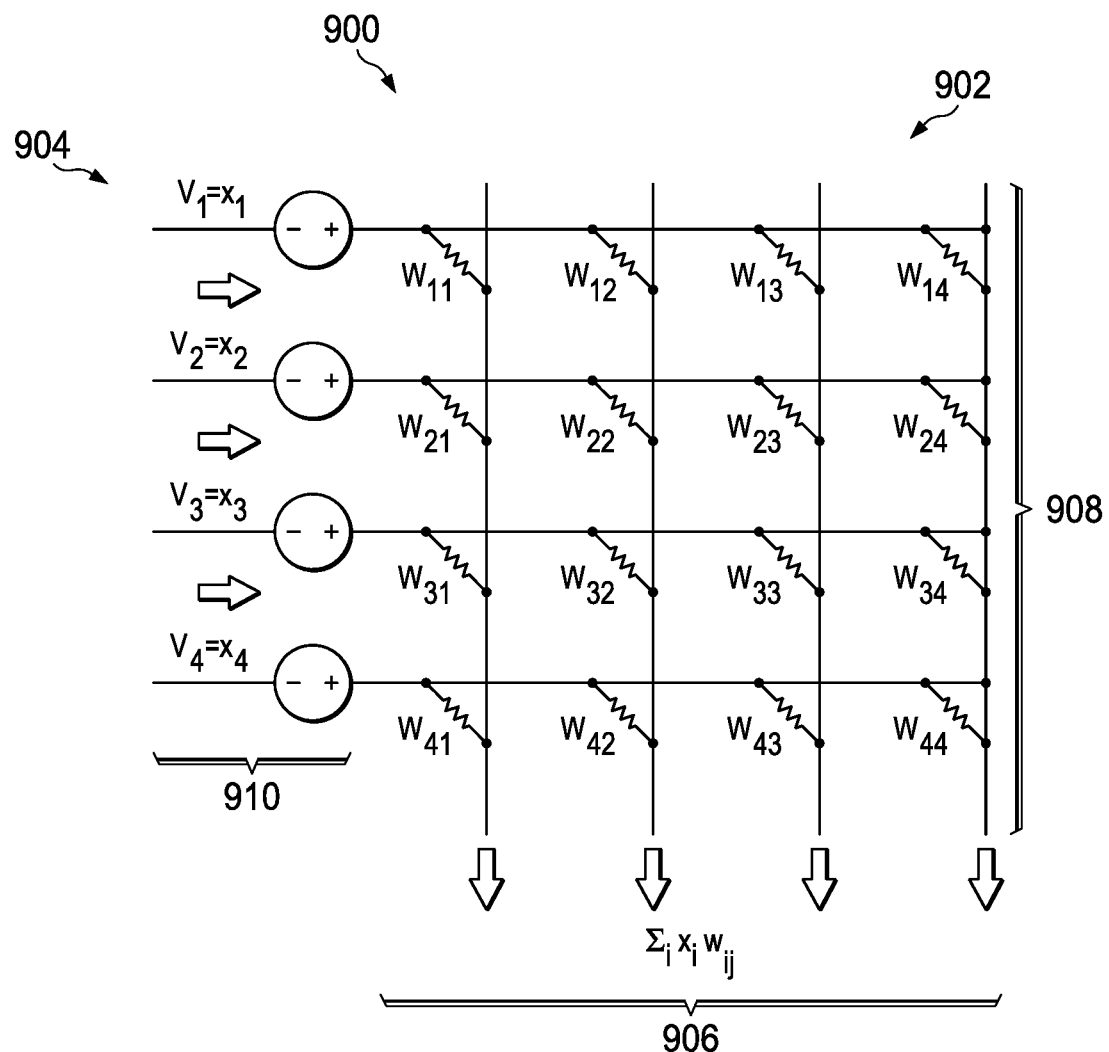
FIG. 9 is an illustration of a parallel read in a neural core in accordance with an illustrative embodiment.

Turning now to FIG. 9, an illustration of a parallel read in a neural core is depicted in accordance with an illustrative embodiment. In this figure, a portion of neural core 900 is shown. As depicted, neural core 900 includes programmable resistive units 902 in array 904 having columns 906 and rows 908. Voltage sources 910 are also present in neural core 900. In this example, voltage sources 910 operate to perform a parallel read or write in neural core 900. Thus, in this example, neural core 900 is configured to output binary values that are a result of a neuron function.

Figure 10:
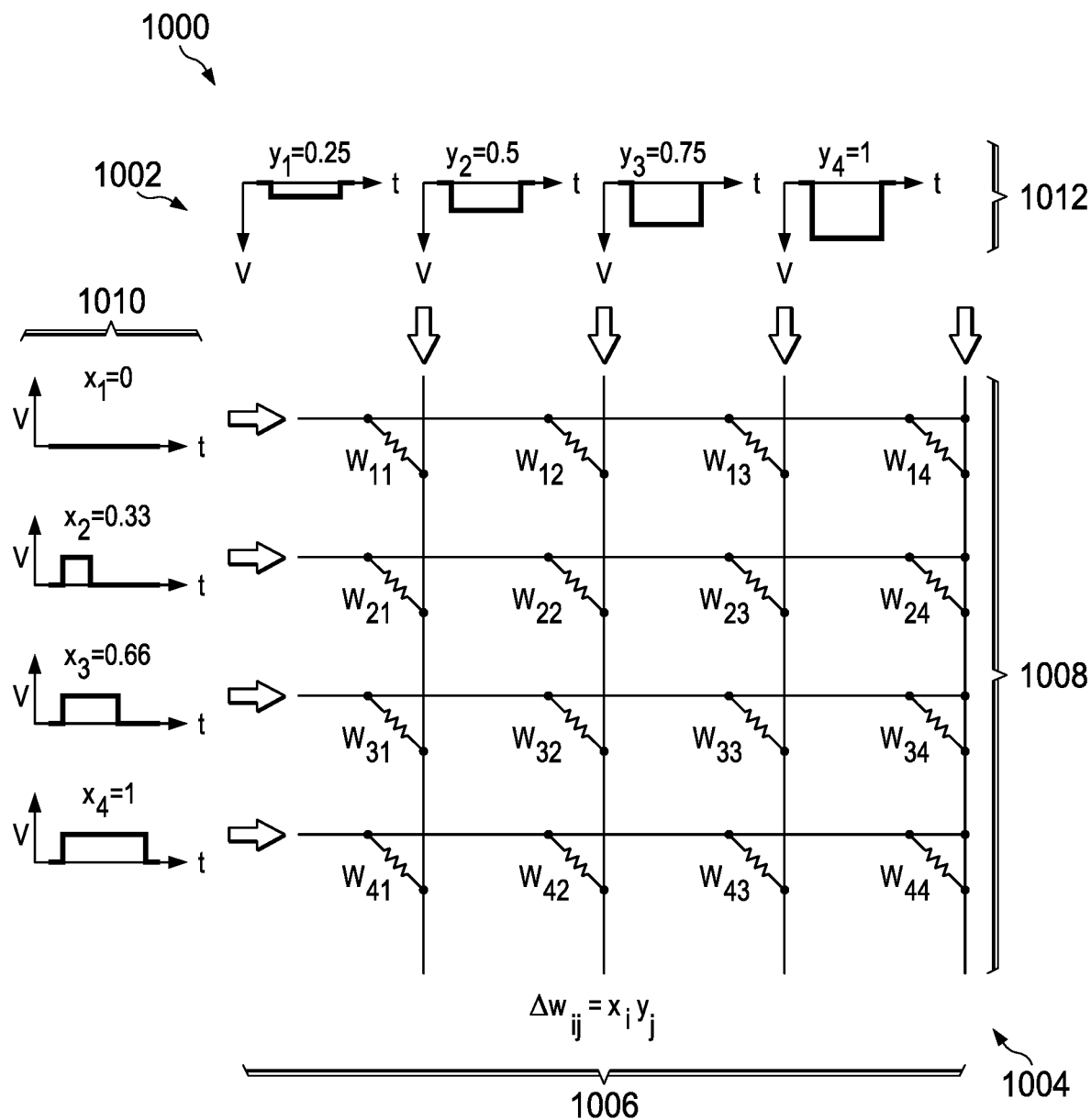
FIG. 10 is an illustration of a vector matrix multiply in a neural core in accordance with an illustrative embodiment.

With reference next to FIG. 10, an illustration of a vector matrix multiply in a neural core is depicted in accordance with an illustrative embodiment. As depicted, neural core 1000 includes programmable resistive units 1002 in array 1004 having columns 1006 and rows 1008.

As depicted, voltages 1010 are applied to rows 1008 and voltages 1012 are applied to columns 1006. These different voltages have different pulse widths and are selected to perform a vector matrix multiply or a rank one update in this example.

The inputs and outputs for neural core 900 in FIG. 9 and neural core 1000 in FIG. 10 are routed to digital processing cores. In this manner, results generated may be further processed. The flexibility of the digital processing cores allows for many different algorithms to be implemented, while still taking advantage of the neural cores to accelerate operations.

Figure 11:
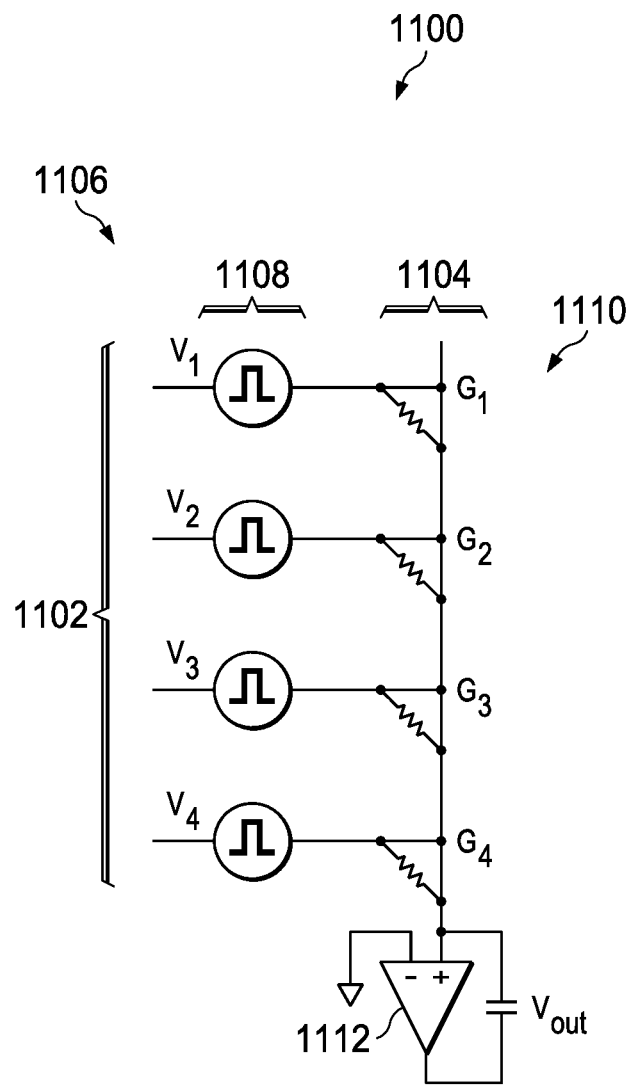
FIG. 11 is an illustration of current integration in a neural core in accordance with an illustrative embodiment.

With reference now to FIG. 11, an illustration of current integration in a neural core is depicted in accordance with an illustrative embodiment. In this illustrative example, a portion of neural core 1100 is shown. In this illustrative example, rows 1102 and column 1104 are shown in the portion of neural core 1100 depicted in this figure.

Voltage sources 1108 provide input pulses into programmable resistive units 1110 to generate currents that are integrated by operational amplifier 1112. In this manner, a current integrated neuron may be formed for neural core 1106. In this illustrative example, input pulses generated by voltage sources 1108 are analog inputs. These analog inputs may be generated by varying at least one of the height of the pulse or the length of the pulse.

Figure 12:
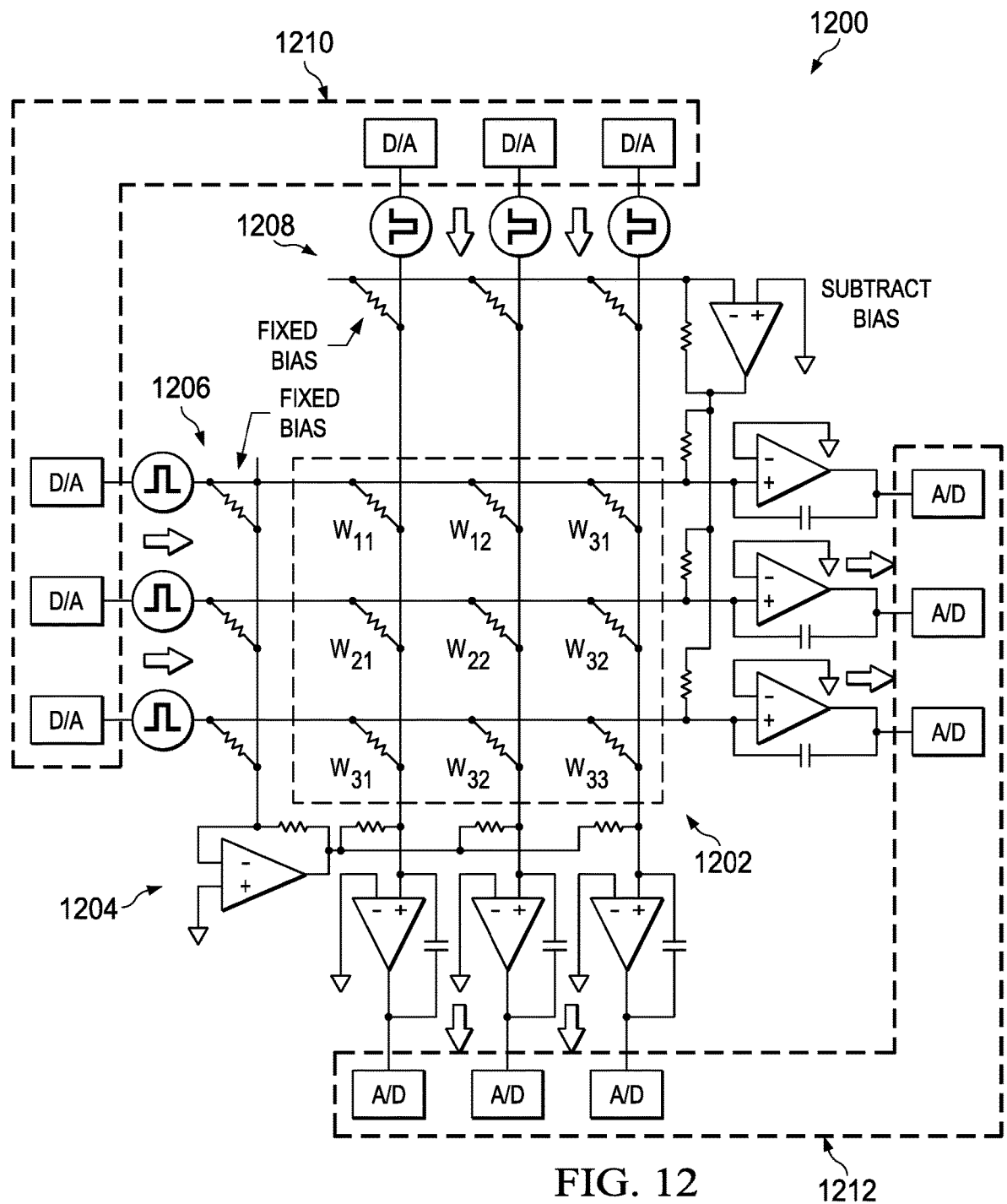
FIG. 12 is an illustration of a neural core with negative weighting in accordance with an illustrative embodiment.

With reference now to FIG. 12, an illustration of a neural core with negative weighting is depicted in accordance with an illustrative embodiment. As depicted, neural core 1200 includes programmable resistive units 1202 arranged in array 1204. Further, negative weighting may be created for neural core 1200 using either a reference resistor or by taking the difference of two resistive memories. In this example, bias row 1206 and bias column 1208 are added to provide for the negative weighting.

As depicted in this figure, digital-to-analog (D/A) units 1210 are present for converting digital signals into analog signals for use by neural core 1200. Analog-to-digital (A/D) units 1212 convert the integrated analog output signals into digital output signals. This conversion may be made using any currently available analog-to-digital converter.

Alternatively, a simple binary function of the output can be computed in analog, such as a threshold function or a stochastic binary neuron that randomly produces a one or zero based on the output. Neural core 1200 may then then communicate at least one of the digitized sum or the binary function. Algorithms that can use a binary output function may reduce the communication costs between cores by communicating only one bit. For example, stochastic binary neurons can either use a conventional pseudo-random number generator, or they can use a hardware random number generator based on avalanche breakdown, coulomb blockade, spin states, or others.

Figure 13:
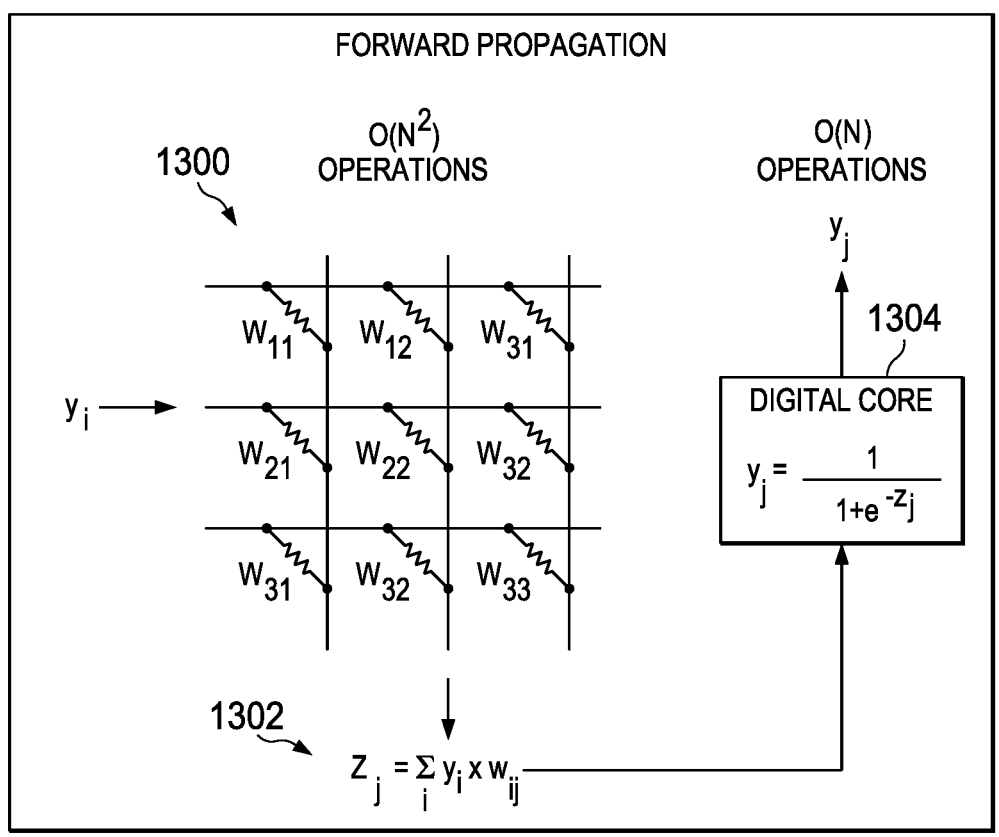
FIG. 13 is an illustration of forward propagation in accordance with an illustrative embodiment.

With reference next to FIG. 13, an illustration of forward propagation is depicted in accordance with an illustrative embodiment. In this example, a vector matrix multiply is performed by neural core 1300. Result 1302 is processed by digital processing core 1304. In this illustrative example, digital processing core 1304 computes a sigmoid neuron function.

Figure 14:
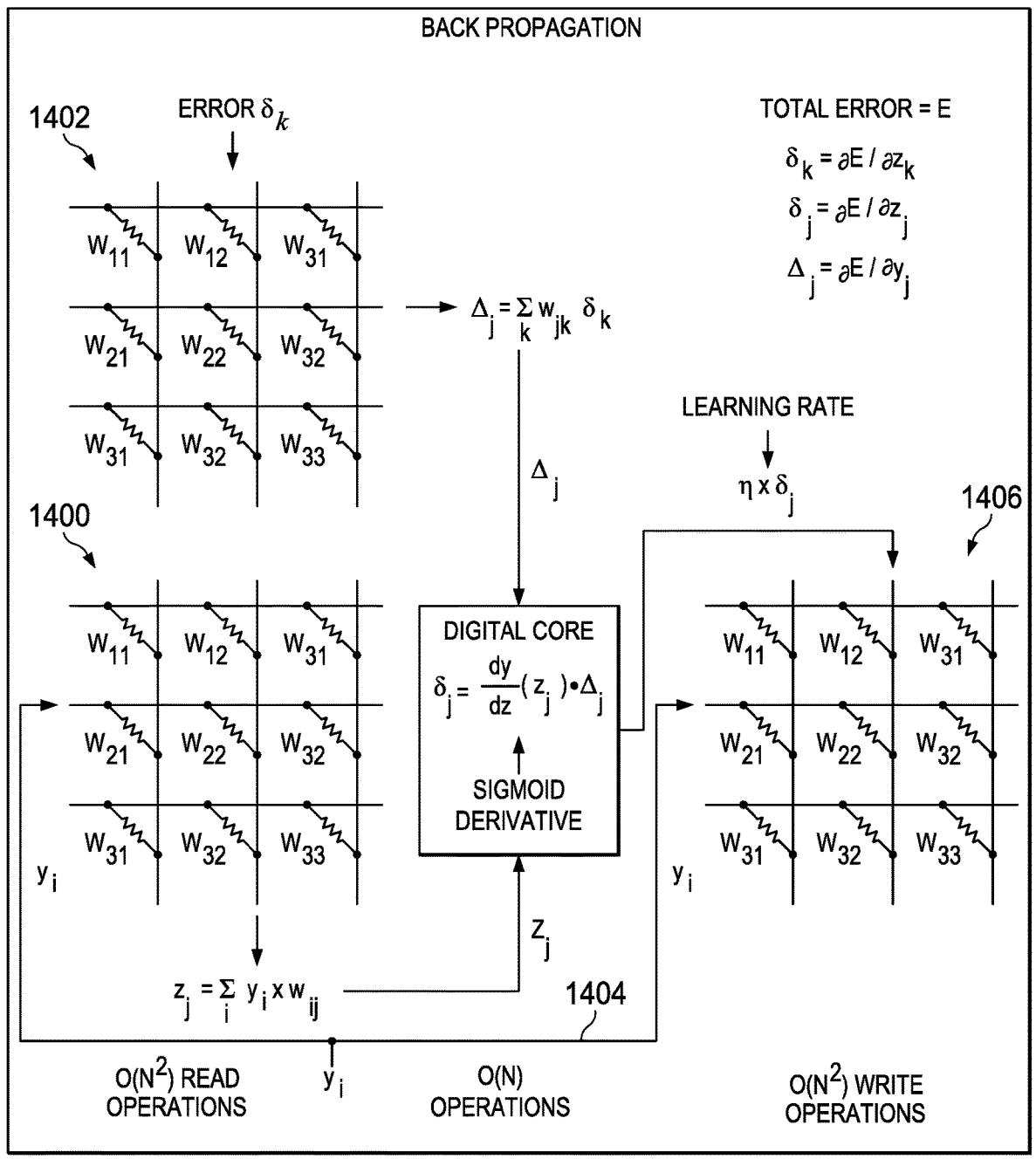
FIG. 14 is an illustration of back propagation in accordance with an illustrative embodiment.

Turning now to FIG. 14, an illustration of back propagation is depicted in accordance with an illustrative embodiment. In this illustrative example, back propagation occurs with read operations from neural core 1400 and neural core 1402. The output from the read operations are inputs into digital processing core 1404, which performs a sigmoid neuron function. The result is output by digital processing core 1404 as an input into neural core 1406. This process may be used to update middle layer weights $w_{ij}$.

Figure 15:
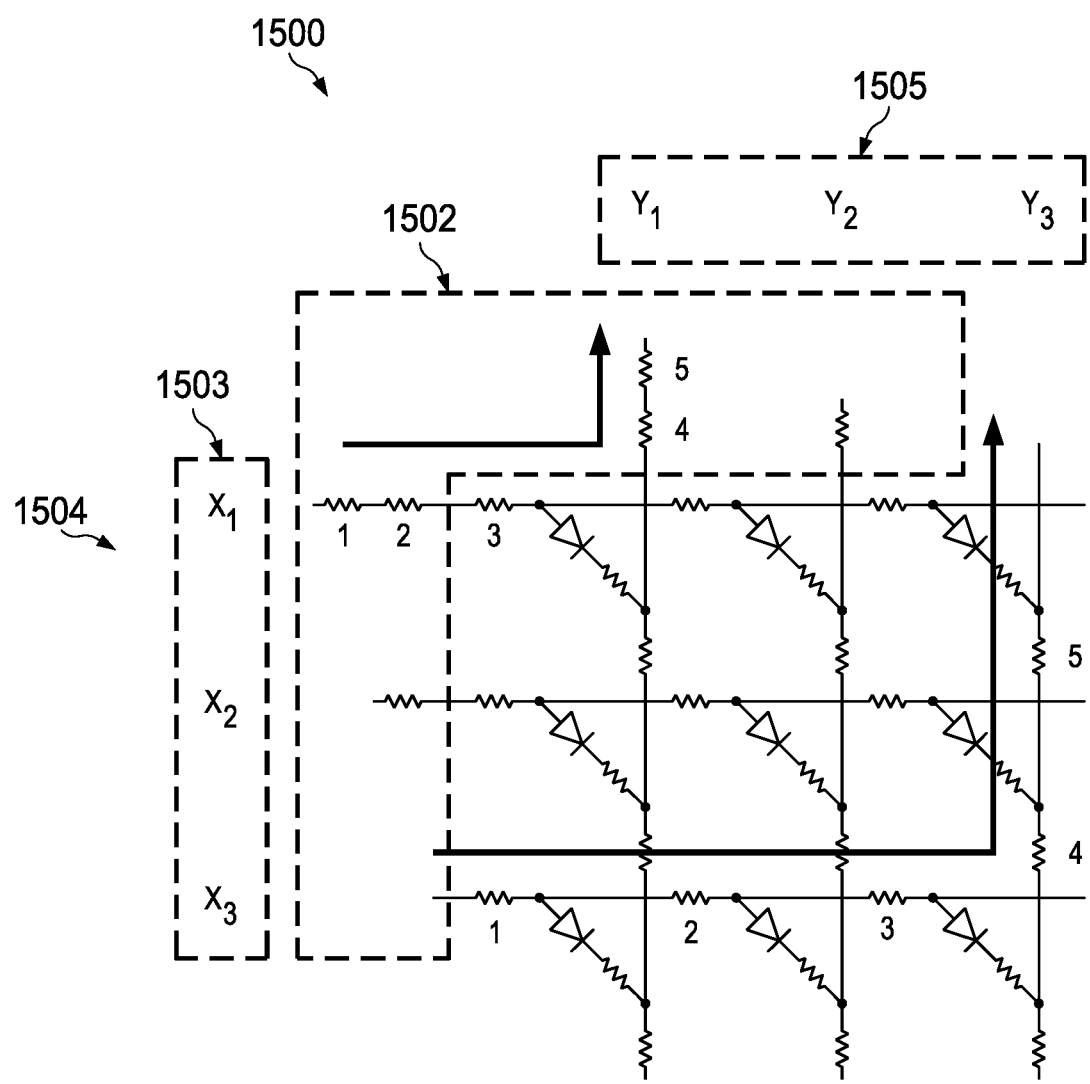
FIG. 15 is an illustration of a portion of a neural core configured to compensate for parasitic resistance in accordance with an illustrative embodiment.

With reference next to FIG. 15, an illustration of a portion of a neural core configured to compensate for parasitic resistance is depicted in accordance with an illustrative embodiment. In this example, neural core 1500 is shown with additional resistors 1502 that are selected to reduce parasitic resistance for neural core 1500.

In performing neural operations, parasitic voltage drop is undesirable. For example, a voltage drop across a 100×100 array of programmable resistive elements may be a loss of up to 60 mV in which the parasitic resistance per programmable resistive element is 1 Ohm. Voltages by programmable resistive units may be lower in some locations as compared to other locations based on the path through the programmable resistive units. As a result, learning performance in a neural core may be reduced much more than desired.

Additional resistors 1502 are included in a configuration such that every single programmable resistive unit sees the same parasitic voltage drop and therefore sees the same voltage. In this manner, each programmable resistive unit may have substantially the same resistance as all of the paths through the programmable resistive units have the same length. For example, the resistance may be resistance RO. In this example, neural core 1500 may be driven by voltage drivers 1503 on left edge 1504 and on top edge 1506. The row drivers are labeled by Xi and column drivers 1505 are Yj as illustrated. The series resistance that should be added to neural core 1500 is N×M and given by:

Row ($i$) Resistance Correction=$(M-i) \times R_0$

Col ($j$) Resistance Correction=$(N-j) \times R_0$

Adding resistors in this manner allows for any path through neural core 1500 to see substantially the same resistance. Some variability may be present due to the variability in the parasitic resistors, but the first order effect of the parasitic voltage drop is eliminated. This compensation scheme in FIG. 15 is designed to equalize the parasitic voltage drop when a programmable resistive unit is read or written with respect to other programmable resistive units. The amount of resistance added to each row or column can also be tuned to match different parallel reads or activity patterns.

This compensation scheme may also be used in digital resistive memory arrays. By ensuring the parasitic voltage drop is substantially the same across all devices, a larger read and write margin can be obtained.

Figure 16:
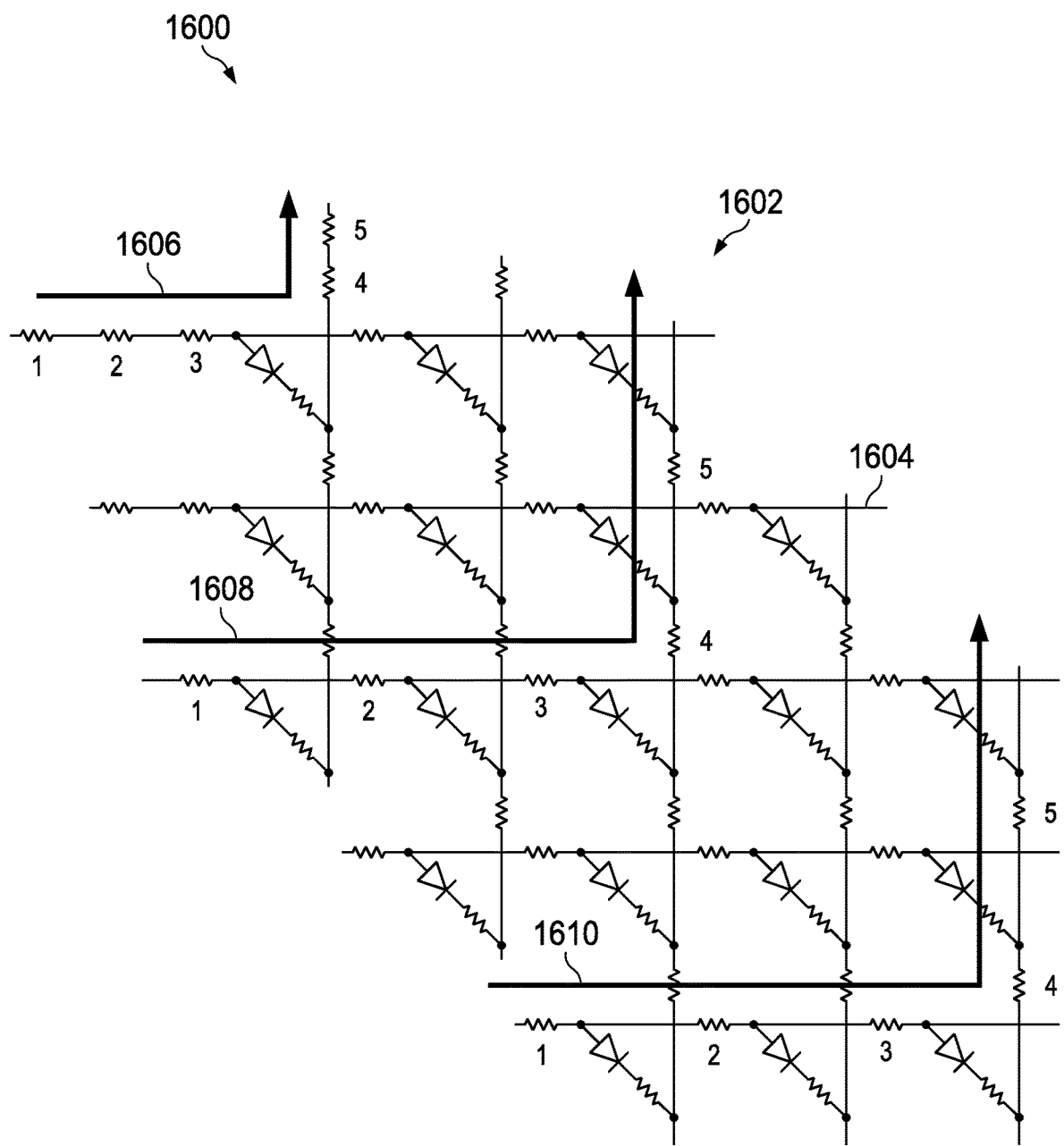
FIG. 16 is another illustration of a portion of a neural core configured to compensate for parasitic resistance in accordance with an illustrative embodiment.

Next in FIG. 16, another illustration of a portion of a neural core configured to compensate for parasitic resistance is depicted in accordance with an illustrative embodiment. In this example, neural core 1600 is shown in a configuration selected to reduce parasitic resistance for neural core 1600.

In this illustrative example, programmable resistive units 1602 in neural core 1600 have staggered configuration 1604. Staggered configuration 1604 is selected such that as many paths as reasonably possible though programmable resistive units 1602 in neural core 1600 have substantially the same length. For example, path 1606, path 1608, path 1610 all have a length of five resistors in the same voltage drop regardless of a programmable resistive unit location in neural core 1600.

Figure 17:
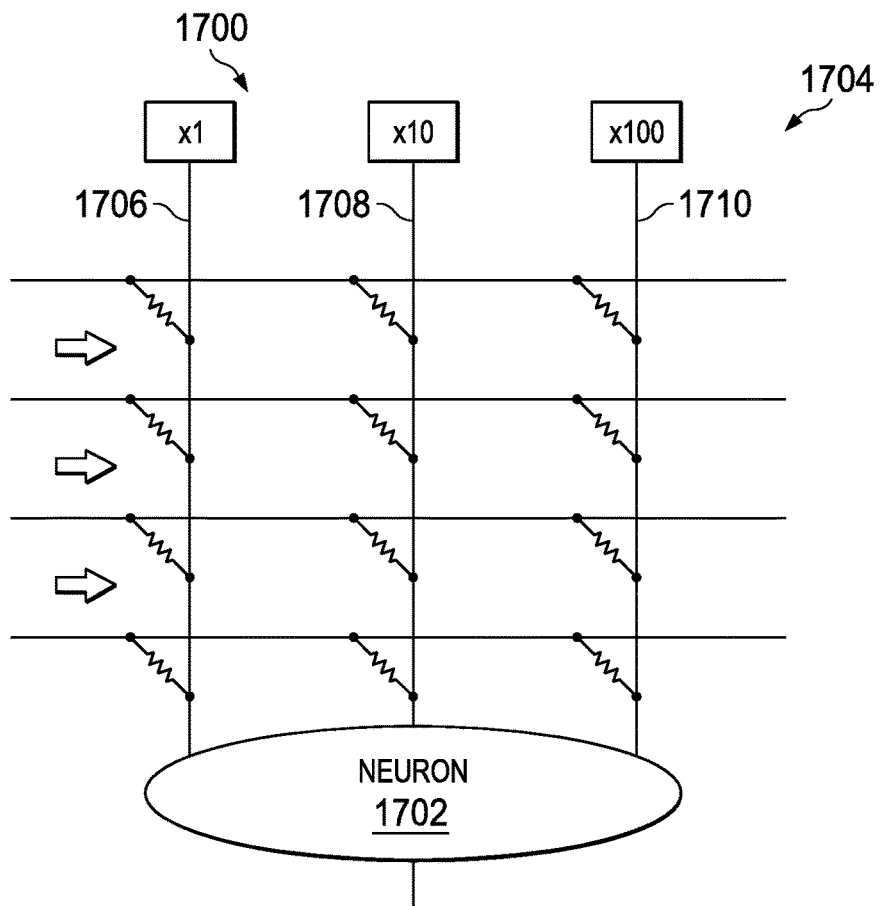
FIG. 17 is an illustration of a portion of a neural core configured with resistive levels for programmable resistance units in accordance with an illustrative embodiment.

With reference to FIG. 17, an illustration of a portion of a neural core configured with numeric scales for programmable resistance units is depicted in accordance with an illustrative embodiment. In this figure, the portion of processor unit 1700 is shown. In this example, processor unit 1700 operates as neuron 1702 that supports a base 10 system.

In designing neuromorphic systems, a single resistive unit for a memory cell is often lower in precision than desired. Further, write noise and nonlinearities may limit the number of levels that a resistive memory can store.

Thus, in this example, redundancy is used such that a single programmable resistive unit can hold ten levels, and five programmable resistive units hold 50 levels. This type of configuration, however, may quickly become expensive as the number of levels needed increases.

As depicted, programmable resistive units 1704 are arranged to have column 1706, column 1708, and column 1710. In this example, column 1706 represents 1's; column 1708 represents 10's, and column 1710 represents 100's in a base 10 system.

The programming of processor unit 1700 may be more expensive than desired. For example, if it is desired to increment a weight by one, all of the programmable resistive units that form a weight are read. A determination is made as to whether a carry is needed, and update multiple programmable resistive units if a carry is needed. As a result, a single weight in processor unit 1700 needs to be individually read and updated. The illustrative embodiments recognize and take into account that a system that can blindly increment a programmable resistive unit memory without knowing its current state and use of a positional number system is desired.

Figure 18:
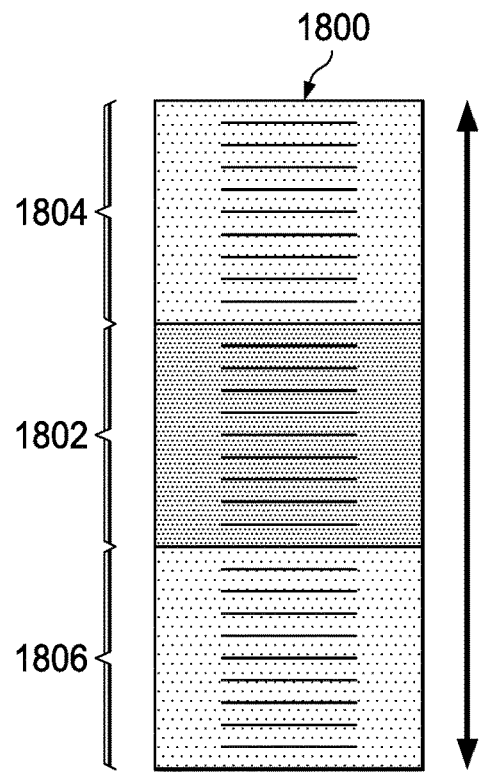
FIG. 18 is an illustration of a multilevel programmable resistive unit in accordance with an illustrative embodiment.

In FIG. 18, an illustration of a multilevel programmable resistive unit is depicted in accordance with an illustrative embodiment. In this figure, the objectives may be achieved using programmable resistive units that have greater than 10 levels to represent a base 10 system as illustrated by programmable resistive unit 1800 in FIG. 18. Levels 1802 presents levels used for a base 10 system. Levels 1804 and levels 1806 represent levels greater and less than levels 1802, respectively. With this configuration of programmable resistive unit 1800, the carry may be ignored and the neural core may be programmed in parallel. Then, programmable resistive unit 1800 may be read periodically and any necessary carries may be performed at that time. The period of time may be, for example, once every few hundred cycles or more. This configuration of programmable resistive unit 1800 averages out at least one of the energy or computational cost when performing a carry over many cycles.

In one example, four 50 level resistive memories implemented using programmable resistive unit 1800 may be used to represent a signed base 5 system. In this example, each of the resistive memories has a Gaussian write noise with a sigma of 2% of the full range. The resistive memories are read and reset the carry every 100 pulses. In this example 100,000 training pulses are applied with a net of 1,000 positive pulses. As depicted, 1,000 positive pulses were applied.

In the illustrative examples, this type of training does not work using a resistive random-access memory (RRAM). The noise completely wipes out the small training signal. However, by using a periodic carry scheme with the resistive memories implemented using programmable resistive unit 1800, roughly 1,000 positive pulses are detected.

The illustration of the processor units and the different components in the processor units in FIGS. 6-18 are provided as examples of some implementations for processor unit 104 shown in block form in FIG. 1. These illustrations are not meant to limit the manner in which other illustrative examples may be limited.

For example, a digital processing unit may have more than one neural core connected to the digital processing unit. In another illustrative example, a computer system may have more than one processor unit implementing architecture as described for the different illustrative examples. In other illustrative examples, conventional processor units may be present in addition to a processing unit such as processor unit 104.

With the architecture described in the different illustrative examples, the same processor unit may be used for training and executing neural networks. In this manner, a more efficient use of the processor units may occur. Further, the processor units may have a higher level of precision than provided through the hardware. Further, as described in the different illustrative examples, the neural cores have digital inputs and digital outputs that perform matrix operations using analog processes.

Figure 19:
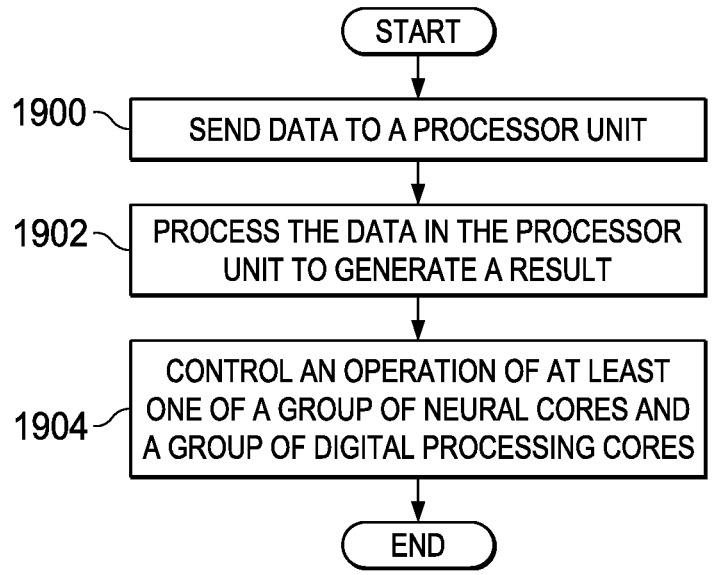
FIG. 19 is an illustration of a flowchart of a process for processing data in accordance with an illustrative embodiment.

Turning next to FIG. 19, an illustration of a flowchart of a process for processing data is depicted in accordance with an illustrative embodiment. The process illustrated in FIG. 19 may be implemented in processor unit 104 in FIG. 1.

The process begins by sending data to a processor unit (step 1900). The processor unit comprises a group of neural cores, a group of digital processing cores, and a routing network connecting the group of digital processing cores, such as processor unit 104 in FIG. 1.

The process then processes the data in the processor unit to generate a result (step 1902). Next, the process controls an operation of at least one of a group of neural cores and a group of digital processing cores (step 1904). Step 1904 may be performed by a controller connected to at least one of the group of neural cores or the group of digital processing cores. Step 1904 is an optional step in this example.

Figure 20:
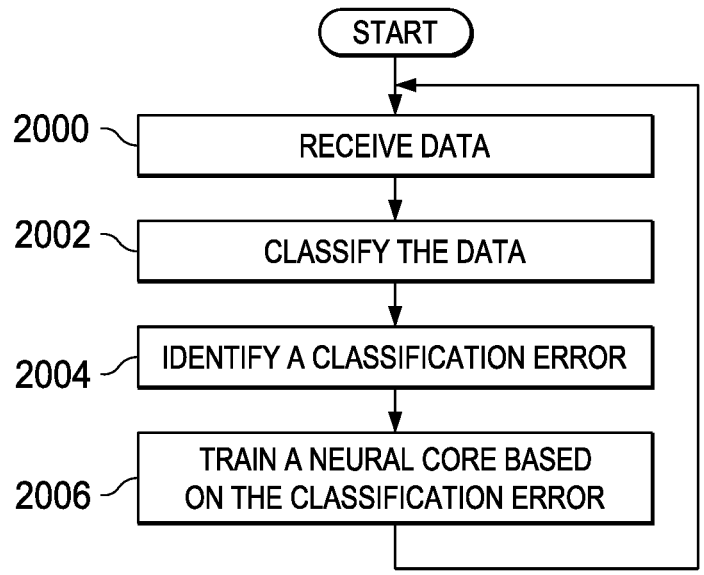
FIG. 20 is an illustration of a flowchart of a process for training a neural core in accordance with an illustrative embodiment.

With reference next to FIG. 20, an illustration of a flowchart of a process for training a neural core is depicted in accordance with an illustrative embodiment. The process in FIG. 20 may be implemented in processor unit 104 in FIG. 1.

The process begins by receiving data (step 2000). The data is received at a neural core in this example. The process then classifies the data (step 2002). The classification is performed by the neural core.

Next, the process computes the classification error (step 2004). The computation of the classification error is performed by a digital processing core in this example. The process then trains the neural core based on the classification error (step 2006). The process repeats until the desired classification accuracy is achieved.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 21:
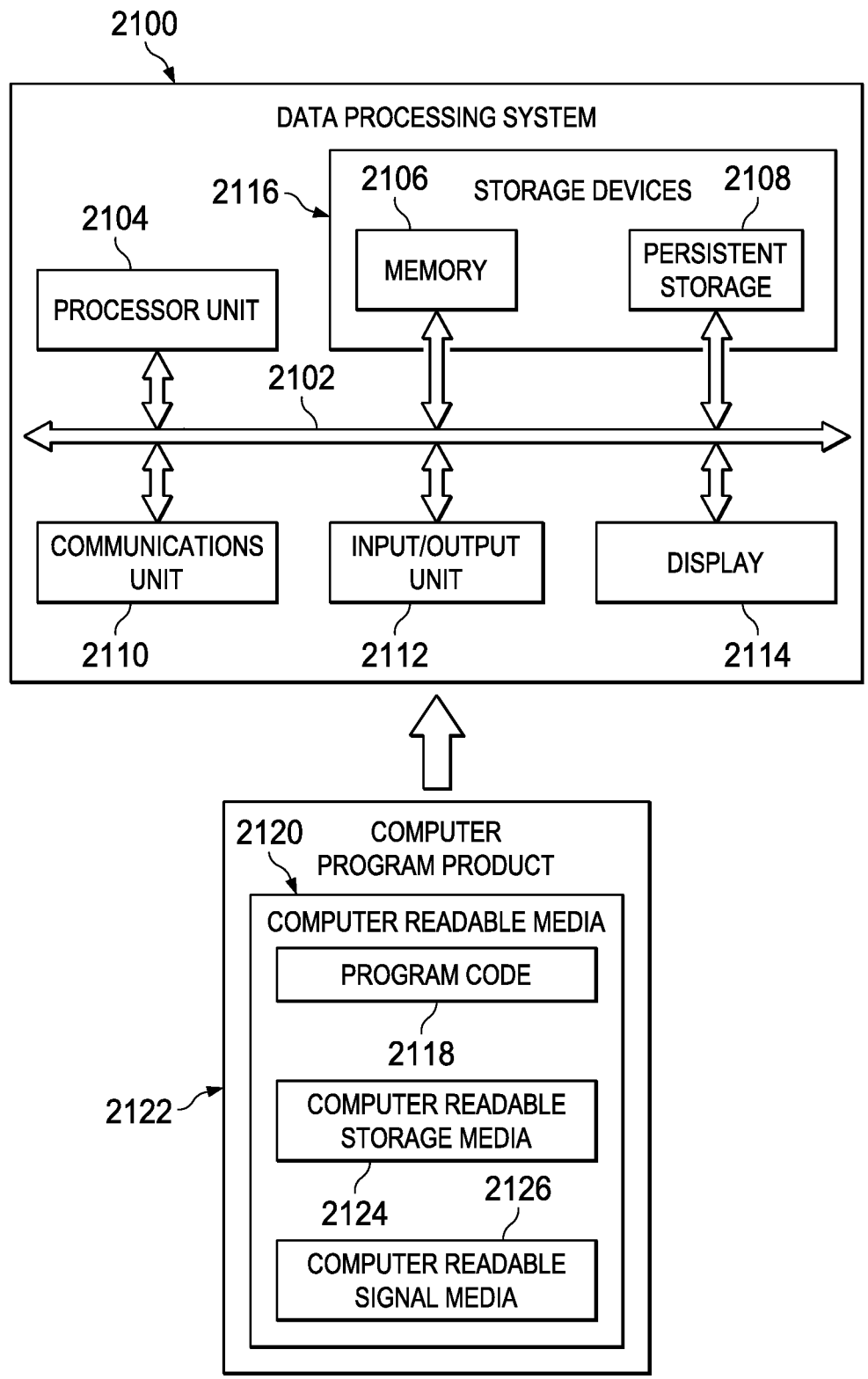
FIG. 21 is an illustration of a block diagram of a data processing system in accordance with an illustrative embodiment.

Turning now to FIG. 21, an illustration of a block diagram of a data processing system is depicted in accordance with an illustrative embodiment. Data processing system 2100 may be used to implement one or more data processing systems in computer system 102. In this illustrative example, data processing system 2100 includes communications framework 2102, which provides communications between processor unit 2104, memory 2106, persistent storage 2108, communications unit 2110, input/output (I/O) unit 2112, and display 2114. In this example, communications framework 2102 may take the form of a bus system.

Processor unit 2104 serves to execute instructions for software that may be loaded into memory 2106. Processor unit 2104 may be a number of processors, a multi-processor core, or some other type of processor, depending on the particular implementation. As depicted, processor unit 2104 may be implemented using processor unit 104 as depicted in the different illustrative examples.

Memory 2106 and persistent storage 2108 are examples of storage devices 2116. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 2116 may also be referred to as computer readable storage devices in these illustrative examples. Memory 2106, in these examples, may be, for example, a random access memory or any other suitable volatile or non-volatile storage device. Persistent storage 2108 may take various forms, depending on the particular implementation.

For example, persistent storage 2108 may contain one or more components or devices. For example, persistent storage 2108 may be a hard drive, a solid state hard drive, a flash memory, a rewritable optical disk, a rewritable magnetic tape, or some combination of the above. The media used by persistent storage 2108 also may be removable. For example, a removable hard drive may be used for persistent storage 2108.

Communications unit 2110, in these illustrative examples, provides for communications with other data processing systems or devices. In these illustrative examples, communications unit 2110 is a network interface card.

Input/output unit 2112 allows for input and output of data with other devices that may be connected to data processing system 2100. For example, input/output unit 2112 may provide a connection for user input through at least one of a keyboard, a mouse, or some other suitable input device. Further, input/output unit 2112 may send output to a printer. Display 2114 provides a mechanism to display information to a user.

Instructions for at least one of the operating system, applications, or programs may be located in storage devices 2116, which are in communication with processor unit 2104 through communications framework 2102. The processes of the different embodiments may be performed by processor unit 2104 using computer-implemented instructions, which may be located in a memory, such as memory 2106.

These instructions are referred to as program code, computer usable program code, or computer readable program code that may be read and executed by a processor in processor unit 2104. The program code in the different embodiments may be embodied on different physical or computer readable storage media, such as memory 2106 or persistent storage 2108.

Program code 2118 is located in a functional form on computer readable media 2120 that is selectively removable and may be loaded onto or transferred to data processing system 2100 for execution by processor unit 2104. Program code 2118 and computer readable media 2120 form computer program product 2122 in these illustrative examples. In one example, computer readable media 2120 may be computer readable storage media 2124 or computer readable signal media 2126.

In these illustrative examples, computer readable storage media 2124 is a physical or tangible storage device used to store program code 2118 rather than a medium that propagates or transmits program code 2118.

Alternatively, program code 2118 may be transferred to data processing system 2100 using computer readable signal media 2126. Computer readable signal media 2126 may be, for example, a propagated data signal containing program code 2118. For example, computer readable signal media 2126 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 2100 are not meant to provide architectural limitations to the manner in which different embodiments may be implemented. The different illustrative embodiments may be implemented in a data processing system including components in addition to or in place of those illustrated for data processing system 2100. Other components shown in FIG. 21 can be varied from the illustrative examples shown. The different embodiments may be implemented using any hardware device or system capable of running program code 2118.

The illustrative embodiments provide a method and apparatus for processing data. In the illustrative examples, a processor architecture for a processor unit is present that includes neural cores and digital processing cores. The neural cores process the data in an analog fashion while the digital processing cores process the data in a digital fashion. A routing network may connect the digital processing cores and also may connect the neural cores. In some illustrative examples, the neural cores are connected directly to the digital processing cores.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A processor unit comprising:
   a group of neural cores, wherein a neural core in the group of neural cores comprises programmable resistive units having resistances that are changeable during operation of the neural core, and wherein columns of the programmable resistive units in the neural core are configured to represent a digit in a positional number system using numeric scales, wherein at least one resistive unit comprises more levels than represented by the unit, and wherein a carry can be ignored during programming and the neural core can be programmed in parallel;
   a group of digital processing cores; and
   a routing network connecting the group of digital processing cores, wherein the group of neural cores processes analog data and the group of digital processing cores processes digital data, and wherein each digital processing core controls one or more neural cores.

2. The processor unit of claim 1 further comprising:
   a controller connected to at least one of the group of neural cores or the group of digital processing cores.

3. The processor unit of claim 1, wherein the group of neural cores is connected to the group of digital processing cores.

4. The processor unit of claim 1, wherein the group of neural cores is connected to the routing network.

5. The processor unit of claim 1, wherein the group of neural cores has digital inputs and processes data using analog processes.

6. The processor unit of claim 1, wherein a neural core in the group of neural cores outputs binary values resulting from a neuron function.

7. The processor unit of claim 1, wherein the neural core further comprises:
voltage sources connected to the programmable resistive units, wherein the voltage sources generate voltages with at least one of voltage levels that are variable or pulse lengths that are variable, and wherein a pulse length in the pulse lengths represents a bit in a bit input.

8. The processor unit of claim 1, wherein the programmable resistive units are arranged in an array, and wherein the neural core further comprises:
additional resistors in at least one of a group of rows or a group of columns such that a voltage drop in each of a plurality of paths through the programmable resistive units is substantially equal to other paths through the programmable resistive units.

9. The processor unit of claim 1, wherein the programmable resistive units are arranged in an array having a staggered configuration that equalizes voltage drops in paths through at least one of a group of rows or a group of columns in the neural core.

10. The processor unit of claim 1, wherein columns of the programmable resistive units are configured to represent numeric scales.

11. The processor unit of claim 1, wherein columns of the programmable resistive units in the neural core are configured to represent a digit in a positional number system using numeric scales, and wherein other columns in other resistive units in a group of other neural cores is configured to represent other digits in the positional number system using other numeric scales.

12. The processor unit of claim 1 further comprising:
a random number generator.

13. The processor unit of claim 12, wherein the group of neural cores and the group of digital processing cores are configured to perform stochastic search.

14. A method for processing data, the method comprising:
sending the data to a processor unit comprising a group of neural cores, a group of digital processing cores, and a routing network connecting the group of digital processing cores, wherein a neural core in the group of neural cores comprises programmable resistive units having resistances that are changeable during operation of the neural core, and wherein columns of the programmable resistive units in the neural core are configured to represent a digit in a positional number system using numeric scales, wherein at least one resistive unit comprises more levels than represented by the unit, and wherein a carry can be ignored during programming and the neural core can be programmed in parallel; and
processing the data in the processor unit to generate a result, wherein each digital processing core controls one or more neural cores.

15. The method of claim 14 further comprising:
controlling an operation of at least one of the group of neural cores and the group of digital processing core using a controller connected to at least one of the group of neural cores or the group of digital processing cores.

16. The method of claim 14, wherein the group of neural cores is connected to the group of digital processing cores.

17. The method of claim 14, wherein the group of neural cores is connected to the routing network.

18. The method of claim 14, wherein the neural core further comprises voltage sources connected to a programmable resistive unit, wherein the voltage sources generate voltages with pulse lengths that are variable, and wherein a pulse length of the pulse lengths represents a bit in a bit input.

19. The method of claim 14, wherein the programmable resistive units are arranged in an array and wherein the neural core further comprises additional resistors in at least one of a group of rows or a group of columns such that a voltage drop in each of a plurality of paths through the programmable resistive units is substantially equal to other paths through the programmable resistive units.

20. The method of claim 14, wherein the programmable resistive units are arranged in an array having a staggered configuration that equalizes voltage drops in paths through at least one of a group of rows and a group of columns in the neural core.

21. The method of claim 14, wherein columns of the programmable resistive units are configured to represent numeric scales.

22. The method of claim 14, wherein columns of the programmable resistive units in the neural core are configured to represent a digit in a positional number system using numeric scales, and wherein other columns in other resistive units in a group of other neural cores are configured to represent other digits in the positional number system using other numeric scales.

23. The method of claim 14 further comprising:
a random number generator in the processor unit, wherein the group of neural cores and the group of digital processing cores are configured to perform stochastic search using random numbers generated by the random number generator.

24. The processor unit of claim 1, wherein resistances of the programmable resistive units are changeable in parallel, and wherein voltage sources connected to rows and columns of resistive units are used to program resistive units.

25. The method of claim 14, wherein resistances of the programmable resistive units are changeable in parallel, and wherein voltage sources connected to rows and columns of resistive units are used to program resistive units.

* * * * *